United States Patent
Wiher et al.

[11] Patent Number: 6,081,530
[45] Date of Patent: Jun. 27, 2000

[54] TRANSMISSION OF ATM CELLS

[75] Inventors: Christian Ray Wiher, Santa Rosa; Ronald L. Knipper, Cotati; Ming Yin, Mill Valley; Shaun Noel Missett, Rohnert Park; James Thomas Martin, Cotati; Frank Peter Marrone, Geyserville; Stanley Hugh Herum, Sebastopol; Fred Clemmer Horton, Santa Rosa; Dirk Kurt Brandis, Navato; John Anthony Fletcher, Novato, all of Calif.

[73] Assignee: Nokia High Speed Access Products Inc., Petaluma, Calif.

[21] Appl. No.: 08/977,198

[22] Filed: Nov. 24, 1997

[51] Int. Cl.⁷ .................................................. H04Q 11/00
[52] U.S. Cl. ........................ 370/395; 370/401; 370/420; 370/463
[58] Field of Search ...................... 370/395, 396, 370/400, 401, 402, 410, 420, 434, 463, 465, 474, 535, 905, 455, 461

[56] References Cited

U.S. PATENT DOCUMENTS

| | | | |
|---|---|---|---|
| 5,408,469 | 4/1995 | Opher et al. | 370/401 |
| 5,491,694 | 2/1996 | Oliver et al. | 370/461 |
| 5,734,656 | 3/1998 | Prince et al. | 370/401 |
| 5,781,549 | 7/1998 | Dai | 370/401 |
| 5,848,068 | 12/1998 | Daniel et al. | 370/409 |

*Primary Examiner*—Ricky Ngo
*Attorney, Agent, or Firm*—Fish & Richardson P.C.

[57] ABSTRACT

A system and method of transmitting data cells are disclosed. The system includes a data transmitting and receiving unit including transceiver circuitry, a main backplane interface, and backplane interconnection circuitry. The transceiver circuitry transmits and receive data cells over the data link, the main backplane interface provides physical interconnection to the backplane, and the backplane interconnection circuitry transmits and receives cells. The main backplane interface including at least one cell signal terminal and at least one operations data signal terminal. The operations data signal terminals are separate from the cell signal terminals. The operations data signal terminals and the cell signal terminals are configured to connect to mating connectors on a backplane. Backplane interconnection circuitry couples the transceiver circuitry to the main backplane interface. The interconnection circuitry receives data cells from the transceiver circuitry and transmit them over cell signal terminals, receives data cells from the cell signal terminals and provide them to the transceiver circuitry for transmission over the first data link, and transmit and receive operations data over the operations data signal terminals. The method includes asserting a signal indicating the priority of a cell to be transmitted over the backplane, receiving on a second backplane signal line a signal that the apparatus may begin transmitting the data cell, and transmitting bits of the data cell on a third backplane signal line after receiving the signal that the apparatus may begin transmitting the data cell.

12 Claims, 16 Drawing Sheets

TRANSMISSION OF ATM CELLS

BACKGROUND

The present invention relates to the transmission of asynchronous transfer mode (ATM) cells.

Asynchronous transfer mode (ATM) data transfer is a communication technology in which fixed-size packets of data, known as "cells," are transferred between ATM switching devices ("switches"). ATM switches may be thought of as circuit oriented, low-overhead packet switches providing virtual channels. The virtual channels provide the basis for both switching and multiplexed transmission. Asynchronous time division (ATD) and fast packet switching are alternate terms which have been employed to describe similar transfer technology.

ATM networks transfer information using a cell format that typically conforms to formats adopted by the International Telecommunications Union (ITU). ITU-standard ATM cells have a 5-byte header field and a 48-byte payload field. The header field carries information pertaining to the transport and routing of an ATM cell through the switching equipment in a communications network. The payload field is available to transfer user-data. User-data may be, for example, digitized video or audio, data from a computer application, or information provided by a higher layer communication protocol.

ATM cells are sent from originating network access equipment, typically located at a customer's premise, to an ATM network and from the ATM network to destination network access equipment, typically located at a second customer's premises. The ATM network provides end-to-end routing of the ATM cells.

SUMMARY

In general, in one aspect, the invention features an apparatus for communicating data cells between a data link and a backplane. The apparatus includes transceiver circuitry, a main backplane interface, and backplane interconnection circuitry. The transceiver circuitry transmits and receive data cells over the data link, the main backplane interface provides physical interconnection to the backplane, and the backplane interconnection circuitry transmits and receives cells. The main backplane interface including at least one cell signal terminal and at least one operations data signal terminal. The operations data signal terminals are separate from the cell signal terminals. The operations data signal terminals and the cell signal terminals are configured to connect to mating connectors on a backplane. Backplane interconnection circuitry couples the transceiver circuitry to the main backplane interface. The interconnection circuitry receives data cells from the transceiver circuitry and transmit them over cell signal terminals, receives data cells from the cell signal terminals and provide them to the transceiver circuitry for transmission over the first data link, and transmit and receive operations data over the operations data signal terminals.

Implementations of the invention may include one or more of the following features. The apparatus may include data cell header translation circuitry that alters header field data in cells exchanged between the backplane interconnection circuitry and the transceiver circuitry. Altering of data cell headers by the data cell header translation circuitry may be determined by the operations data received over the operations data signal terminals. The invention may include an operations processor that transmits and receives operations, administration, maintenance, and provisioning (OAMP) data over the operations data signal terminals using the high level data link control (HDLC) protocol. Implementations may include a processor coupled to the backplane interconnection circuitry and to the transceiver circuitry and configured to receive variable-length data transmissions over the operations data signal terminals, convert the variable-length data to fixed-length cells, and provides the fixed-length cells to the transceiver circuitry for transmission over the data link.

Implementations of the invention may also include one or more of the following features. The apparatus may be implemented on a card configured to be plugged into a backplane having backplane mating connectors corresponding to the separate terminal connectors. A fiber-optic data link interface may couple the transceiver circuitry to a synchronous optical network (SONET) data link. A high bit-rate digital subscriber line (HDSL) data link interface may be coupled to the transceiver circuitry.

In various aspects, implementations of the invention may include separate terminals to receive cells and separate terminals to transmit cells. The terminals to receive cells may include a first and second control terminal and at least one incoming cell data terminal. To receive a cell, the backplane interconnection circuitry may asserts a signal on the first control terminal to indicate that the apparatus is ready to receive a cell, accepts a signal on the second control terminal as indicating that a cell is being sent to the apparatus, and receives data bits of the cell on the incoming cell data terminals. Cell may be serially received over a single incoming cell data terminal or may be received in parallel over multiple incoming cell data terminals. The terminals to transmit cells may include a first and second control terminal and at least one outgoing cell data terminal. To transmit cells, the backplane interconnection circuitry may asserts a signal on the first control terminal to indicate that the apparatus is ready to transmit a cell, accepts a signal on the second control terminal as indicating that the apparatus may begin transferring the cell, and transmits data bits of the cell on the outgoing cell data terminal. Cells may be serially transmitted over a single outgoing cell data terminal or may be transmitted in parallel over the multiple outgoing cell data terminals. The signal indicating the unit is ready to transmit a cell may include a cell priority indicator.

In various aspects, implementations of the invention may include second transceiver circuitry to transmitting and receiving data cells over a second data link and to provide data cells to and receive data cells from the backplane interconnection circuitry. The first transceiver and second transceivers may each have associated unique port addresses. The backplane interconnection circuitry may receive data cells having port address data in the cell headers and provide data cells having the first port address to the first transceiver but not to the second transceiver, while data cells having the second port address are provided to the second transceiver but not to the first transceiver. Each cell may include a five byte header field and a forty-eight byte payload field. The fifth byte of the header field may include the port address identifier.

Implementations of the invention may also include a backup backplane interface. The backup backplane interface may include at least one cell signal terminal and at least one operations data signal terminal. Each of the operations data signal terminals is separate from each cell signal terminal. The apparatus may include a status terminal connector to receive a status signal from a corresponding connector on the backplane and to provide the status signal to the backplane interconnection circuitry. The backplane interconnection circuitry may be configured to transmit and receive data cells over the main backplane interface but not over the backup backplane interface during a first state of the status signal and to transmit and receive data cells over the backup backplane interface but not over the main backplane interface during a second state of the status signal. The backplane interconnection circuitry may also be configured to transmit and receive operations data over the main backplane interface but not over the backup backplane interface during the first state of the status signal and to transmit and receive operations data over the backup backplane interface but not over the main backplane interface during the second state of the status signal.

Implementations of the invention may include a second status terminal connector to receive a second status signal from a corresponding connector on the backplane. During a first state of the second status signal the backplane interconnection circuitry may be configured to transmit and receive operations data over the main backplane interface but not over the backup backplane interface. During a second state of the second status signal the backplane interconnection circuitry may be configured to transmit and receive operations data over the backup backplane interface but not over the main backplane interface.

In general, in another aspect, the invention features a method of sending a data cell over backplane signal lines. The method includes asserting on a first backplane signal line a signal indicating the priority of a cell to be transmitted over the backplane. Receiving on a second backplane signal line a signal that the apparatus may begin transmitting the data cell, and transmitting bits of the data cell on a third backplane signal line after receiving the signal that the apparatus may begin transmitting the data cell.

In general, in another aspect, the invention features a method of receiving a data cell. The method includes asserting on a first backplane signal line a signal identifying an addressable apparatus port that is ready to receive a data cell. Receiving on a second signal line a signal indicating that a data cell is being transferred to the apparatus, and receiving on a third signal line bits of the data cell being transferred to the apparatus.

In general, in another aspect, the invention features an apparatus for communicating data cells between a data link and a backplane. The apparatus includes transceiver circuitry to transmit and receive data cells over a data link and a plurality of backplane interfaces each including at least one cell signal terminal. Each of the backplane interface is coupled to a backplane interconnection circuit. Each backplane interconnection circuit transmits and receives cells over the cell signal terminals of its associated backplane interface. The apparatus also includes de-multiplexing circuitry coupling the transceiver circuitry to each of the backplane interconnection circuits. The de-multiplexing circuitry receives a data cell from the transceiver circuitry, select a backplane interconnection circuit associated with the data cell, and provide the data cell to the selected backplane interconnection circuit for transmission over the cell signal terminals of the associated backplane interface. The apparatus also includes multiplexing circuitry coupling the plurality of backplane interconnection circuits to the transceiver circuitry. The multiplexing circuitry receives data cells from each of the backplane interconnection circuits and provide the received data cells to the transceiver circuitry.

Implementations of the invention may include one or more of the following features. The backplane interconnection circuits may independently receive and transmit data cells over the plurality of backplane interfaces. The de-multiplexing circuitry may select a backplane interface based on data in the header field of the data cell. The apparatus may include header translation circuitry to alter header data in cells sent between the plurality of backplane interfaces and the transceiver circuitry. Each of the plurality of backplane interfaces may include separate terminals to receive cells and separate terminals to transmit cells. The terminals to transmit cells may include a first and second control terminal and at least one outgoing cell data terminal. A backplane interface's backplane interconnection circuitry may accepts a signal on the first control terminal as indicating that a cell may be sent over the interface, asserts a signal on the second control terminal to indicate that a cell is being transmitted, and transmits data bits of the cell on the outgoing cell data terminal. Each backplane interface may include a single outgoing cell data terminal and each bit of the cell may be serially transmitted over the single outgoing cell data terminal. Each backplane interface may include multiple outgoing cell data terminals and bits of the cell may be sent in parallel over the eight outgoing cell data terminals.

In various implementations, the terminals to receive cells may include a first and second control terminal and at least one incoming cell data terminal. A backplane interface's backplane interconnection circuitry may accepts a signal on the first control terminal as indicating that a cell is ready to be sent to the apparatus, asserts a signal on the second control terminal to indicate that the apparatus is ready to receive the cell, and receiving data bits of the cell on the incoming cell data terminal. Each backplane interface may include a single incoming cell data terminal and each bit of the cell may be serially received over the single incoming cell data terminal. Each backplane interface may include multiple incoming cell data terminals and bits of the cell are may be received in parallel over the multiple incoming cell data terminals.

Implementations of the invention may include a status terminal connector to receive a status signal from the backplane and provide the status signal to each backplane interconnection circuit. The backplane interconnection circuits may transmit and receive data cells during a first state of the status signal but not during a second state of the status signal.

In general, in another aspect, the invention features a method of transmitting a data cell over a backplane. The method includes receiving a data cell over a data link interface. Examining header information in the received data cell. Selecting one of a plurality of backplane cell interfaces. Receiving on a first signal line of the selected interface a signal indicating that a data cell may be transmitted on the interface. Transmitting on a second signal line of the selected interface a signal indicating that transfer of the data cell is occurring, and transmitting bits of the data cell on a third signal line of the selected interface. Implementations of the invention may include selecting based on a port address in a data cell header.

DETAILED DESCRIPTION

Figure 1A:
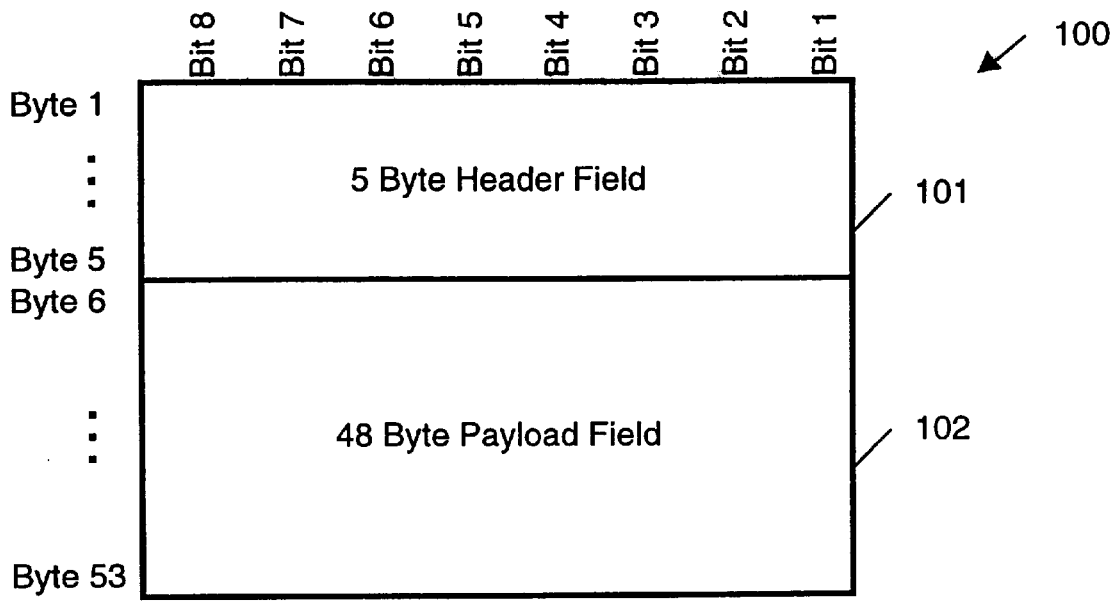
FIGS. 1A, 1B, and 1C illustrate standard ATM cell fields.
Figure 1B:
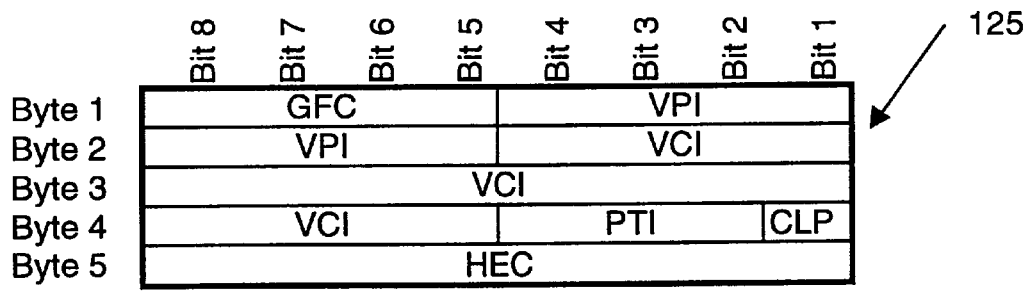
Figure 1C:
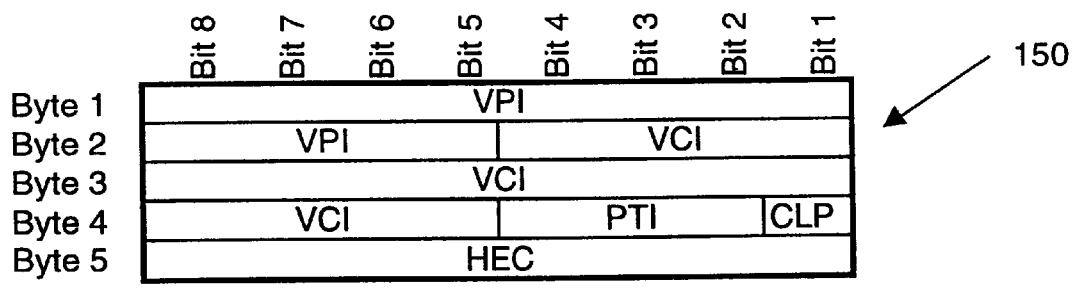

FIG. 1A illustrates an ATM cell having a 53-byte format as defined by the ITU. The ATM cell 100 includes a header field 101 and a payload field 102. An ITU-standard header field 101 may be either a user-network interface header or a network—network interface header. FIGS. 1B and 1C illustrate, respectively, a user-network interface header 125 and a network—network interface header 150. In general, ATM cells having a user-network interface header 125 are sent between ATM network access equipment that is located at an endpoint of an ATM connection and ATM network switching equipment ("nodes"). Cells having a network—network interface header 150 are sent between nodes in the ATM network, i.e., from non-endpoint to non-endpoint ATM cell switching equipment. User-network interface headers 125 and network—network interface headers 150 include multiple information sub-fields and differ in the information contained in the first byte ("Byte 1") of cell header 125 and cell header 150.

A user-network header 125 (FIG. 1B) includes a four-bit generic flow control (GFC) field, an eight-bit virtual path identifier (VPI) field, a sixteen-bit virtual channel identifier (VCI) field, a three-bit payload type identifier (PTI) field, a one-bit cell loss priority (CLP) field and an eight-bit header error control (HEC) field. The GFC field carries information to assist in controlling the flow of ATM cells over the user-network interface. The VPI field identifies a virtual path and the VCI field identifies the virtual channel for routing the ATM cell through a network. The PTI field identifies whether the cell contains user or network management related information. The CLP field indicates the cell loss priority. If the value of the CLP field is 1, the cell may be subject to discard, depending on network conditions such as a network overload. If the value of the CLP field is 0, the cell has high priority and therefore ATM nodes should allocate sufficient network resources to prevent cell discard and ensure transport of the cell. The HEC field contains header error control information to detect transmission errors in header 101 information. Additional information on these standard header fields can be found in *ATM User-Network Interface Specification Version* 3.1, ATM Forum, 1994.

A network—network header 150 (FIG. 1C), also known as a node-network header, has VCI, PTI, CLP, and HEC fields with the same bit size and functionality as corresponding fields in the user-network header 125. However, since GFC information is not used between nodes in an ATM network, the network—network header does not include a GFC field. Additionally, the network—network header has a twelve-bit VPI field allowing a larger VPI address space than is available in a user-network header.

Figure 2:
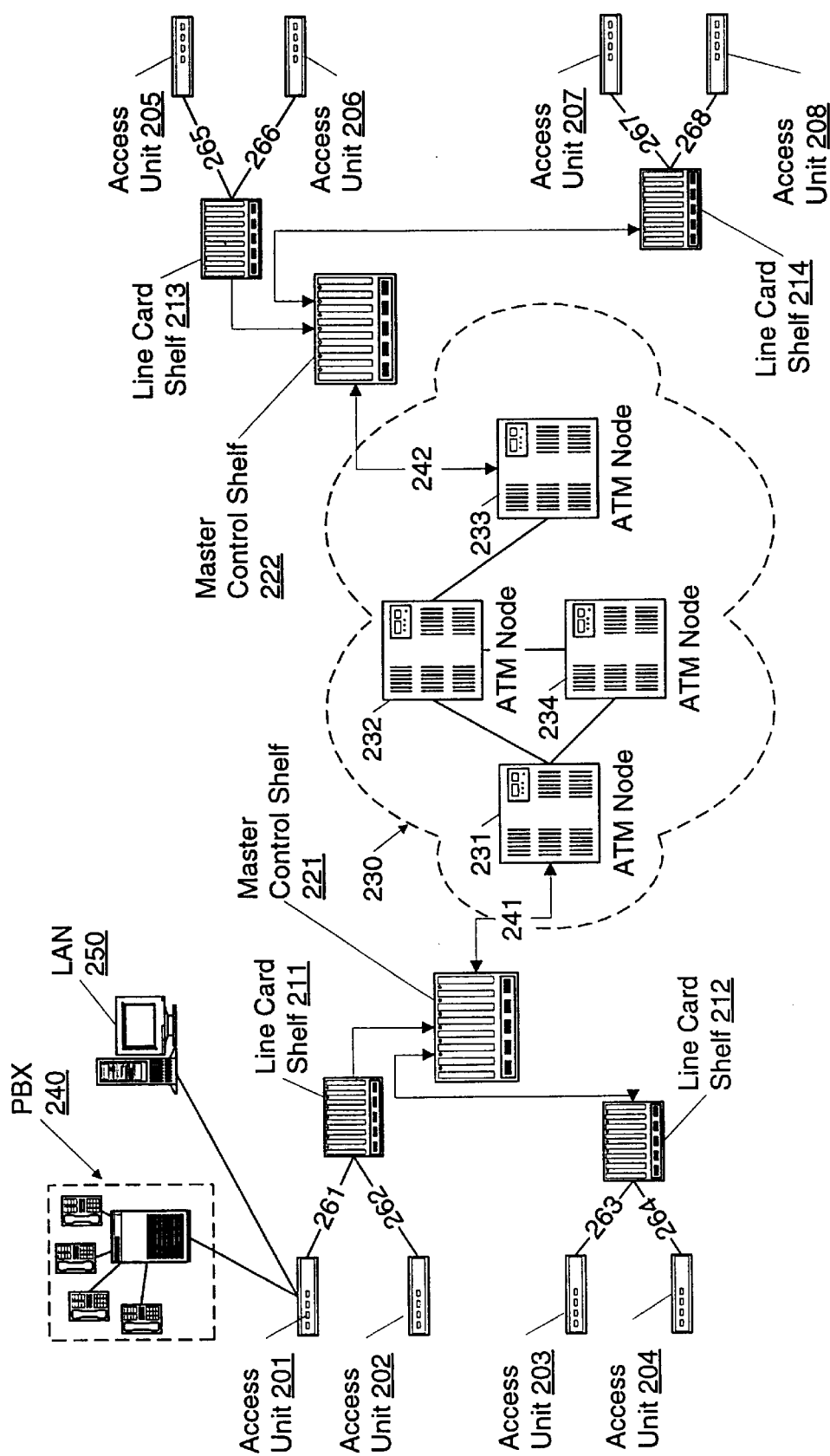
FIG. 2 is a communications network in accordance with the invention.

FIG. 2 is an exemplary ATM network. ATM cells can be used to establish a communication path between network access equipment 201–208. Network access equipment 201–208 forms the originating and terminating point in an ATM communication and may convert non-ATM data traffic into an ATM format. Conversion of non-ATM data traffic to ATM cells is provided by ATM adaptation layer (AAL) services. Standard AAL services are defined in Bellcore publication GR-1113-CORE, *Asynchronous Transfer Mode and ATM Adaptation Layer (AAL) Protocols*, 1994. AAL services may be used, for example, to convert a 1.544 megabit per second continuous bit rate (CBR) circuit-oriented T1 connection to an ATM virtual circuit connection or to convert variable-length packet data traffic originating on a local area network (LAN) to ATM cells for transport on an ATM network. ATM cells are sent from network access equipment to the ATM network using a user-network interface header 125 (FIG. 1B).

Network access equipment 201–208 may combine data from multiple sources. For example, data from a LAN 250 and circuit oriented traffic, such as a T1 connection from a private branch exchange phone system (PBX) 240, may each be converted to ATM cells at network access equipment 201. ATM cells corresponding to LAN 250 and PBX 240 data are multiplexed together and sent by the network access equipment 201 over media 261 to a line card in a line card shelf 211. VPI and VCI information in transmitted ATM cells is used to uniquely identify data sources and destinations at, for example, network access equipment 201, line card shelf 211, master control shelf 221, and within the ATM network 230. For example, by assigning a unique VPI/VCI value to ATM cells transporting LAN 250 data and different VPI/VCI value to cells transporting PBX 240 data, independent routing and logical separation of the PBX 240 and LAN 250 data can be maintained.

ATM cells originating at network access equipment 201–208 are sent over transmission loops 261–268 between the network access equipment and line cards in line card shelves 211–214. A loop 261–268 may be, for example, a digital subscriber line operated over a twisted wire pair connection. A loop 261–268 terminates at a line card in a line card shelf 211–214. A line card shelf 211–214 may house multiple line cards. Each line card terminates one or more loop connections to network access equipment 201–208. A master control shelf 221, 222 is connected to one or more line card shelves. For example, line card shelves 211 and 212 are connected to master control shelf 221 and line card shelves 213 and 214 are connected to master control shelf 222. A master control shelf 221, 222 is a card shelf that controls and regulates the flow of data between line card shelves and a trunk interface 241, 242. A trunk interface 241, 242 provides a trunk connection 241, 242 between the master control shelf 221, 222 and the ATM network 230. Trunk interface 241, 242 is, for example, a 45 Mbit/second T-3 interface or a standard 155 Mbit/second fiber optic synchronous optical network optical carrier level 3 concatenated data (SONET OC-3c) interface.

In an ATM network, a particular VPI/VCI value in a cell header is used to route a cell between the switching ports of two connected nodes, but the particular VPI/VCI value does not provide for routing through multiple nodes. To route a cell from one endpoint to another endpoint through multiple nodes in an ATM network, VPI/VCI information must be translated at each node. Thus, to route an ATM cell, a node performs the following steps: 1) an incoming cell's VPI/VCI information is read, 2) a node output port providing cell transport to a destination node is determined based on the VPI/VCI information in the incoming cell's header; 3) the node replaces the cell's VPI/VCI information with new VPI/VCI information for routing through the destination node, and 4) the node forwards the cell through the determined output port to the destination node. The destination node repeats this process until the cell reaches its final destination.

For example, consider an ATM cell that is to be transmitted from network access equipment 201 to network access equipment 206. The cell may traverse a path between access equipment 201, line card shelf 211, master control shelf 221, node 231, node 232, node 233, master control shelf 222, line card shelf 213 and access equipment 206. Prior to transmission of ATM cells from access equipment 201 to 206, VPI/VCI translation information is established at each point in the path between 201 to 206. VPI/VCI translation information may be established by exchanging special ATM cells providing information to control processors in the various network nodes. Next, at network access equipment 201, cells are formatted with user-network interface headers and are assigned a VPI/VCI value. The assigned VPI/VCI value allows routing between line card shelf 211 input and output ports, but not through, for example, the master control shelves 221 and 222, nodes 231–233, line card shelf 213 or access equipment 206. To accomplish cell transport between access equipment 201 and 206, VPI/VCI translation information is established at each point along the path between access equipment 201 to 206. Thus, for example, when the cell is received at 211, the VPI/VCI information in the user-network interface header is replaced with new routing information to allow routing through master control shelf 221. When the cell is received by the master control shelf 221, the routing information is replaced by new VPI/VCI information to allow routing through node 231. Similarly, header translation occurs at node 232, node 233, master control shelf 222 and at line card shelf 213. Once established, VPI/VCI translation information persist until the communication path between network access equipment endpoints 201 and 206 is no longer needed.

Figure 3:
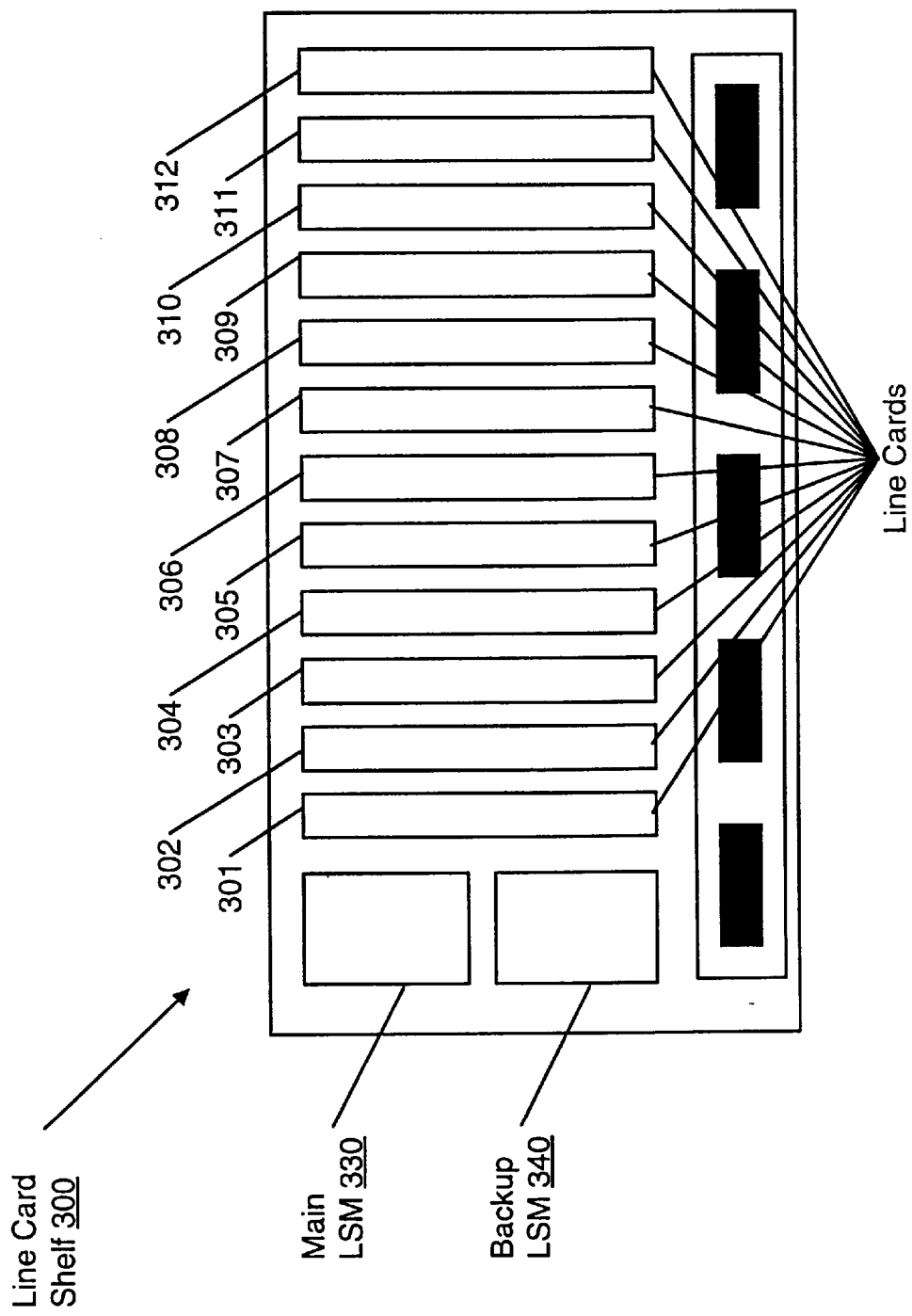
FIG. 3 is a line card shelf in accordance with the invention.

ATM cells are sent between an ATM network access unit 201–208 and a line card in a line card shelf 211–214 over a wire loop 261–268. FIG. 3 illustrates a line card shelf 300 having, for example, twelve line cards 301–312. Each line card 301–312 terminates, for example, two subscriber loop connections to network access units 201–208. The line cards support, for example, high bit rate digital subscriber line (HDSL), asymmetric digital subscriber line (ADSL), or a rate adaptive digital subscriber line (RADSL) data transmission over the subscriber loops. A line card shelf 300 also includes a main line card shelf multiplexer (LSM) 330 and a backup LSM 340.

Figure 4:
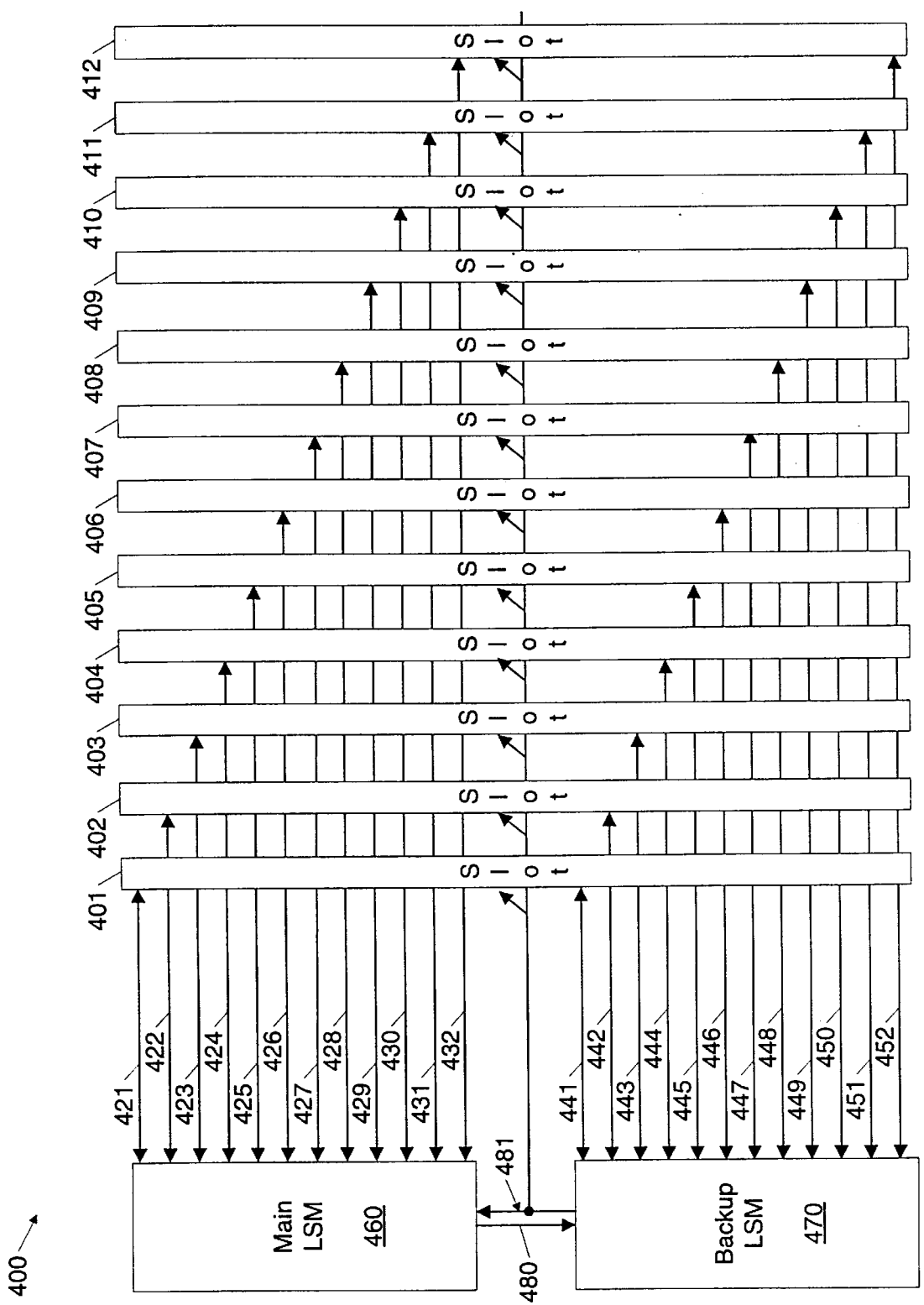
FIG. 4 is a line card shelf backplane in accordance with the invention.

A line card shelf 300 includes a line card shelf backplane. FIG. 4 illustrates a line card shelf backplane 400. The line card shelf backplane 400 has twelve line card slots 401–412 and two line card shelf multiplexer (LSM) slots 460 and 470. A line card slot 401–412 is the point at which a line card is coupled to conductive signal paths on the backplane 400. LSM slots 460 and 470 are the points at which LSM's are coupled to line card shelf backplane signal paths. Main LSM signal paths 421–432 and backup LSM signal paths 441–452 couple line card slots 401–412 to the main LSM slot 460 and the backup LSM slot 470. Each line card slot 401–412 is connected over a dedicated signal path to main LSM slot 460 and over a second dedicated path to backup LSM slot 470. For example, line card slot 401 is connected to main LSM slot 460 over signal path 421 and to backup LSM slot 470 over signal path 441, while line card slot 402 is connected to main LSM slot 460 over signal path 422 and to backup LSM slot 470 over signal path 442. Line card slots 403–412 are similarly connected to the main LSM slot 460 over signal paths 423–432 and to backup LSM slot 470 over signal paths 443–452, respectively. A line card shelf backplane 400 also has LSM status signal paths 480 and 481. Status signal path 480 provides a single conductive path over which main LSM 460 conveys its status to the backup LSM 470. Status information sent from the main LSM to the backup LSM indicates whether the main LSM is in an active state or whether the main LSM is in a standby or failure state. Similarly, status signal path 481 provides a single shared conductive path over which backup LSM 470 conveys its status (active or standby) to the main LSM 460 and to line cards in each of the line card slots 401–412.

Figure 5:
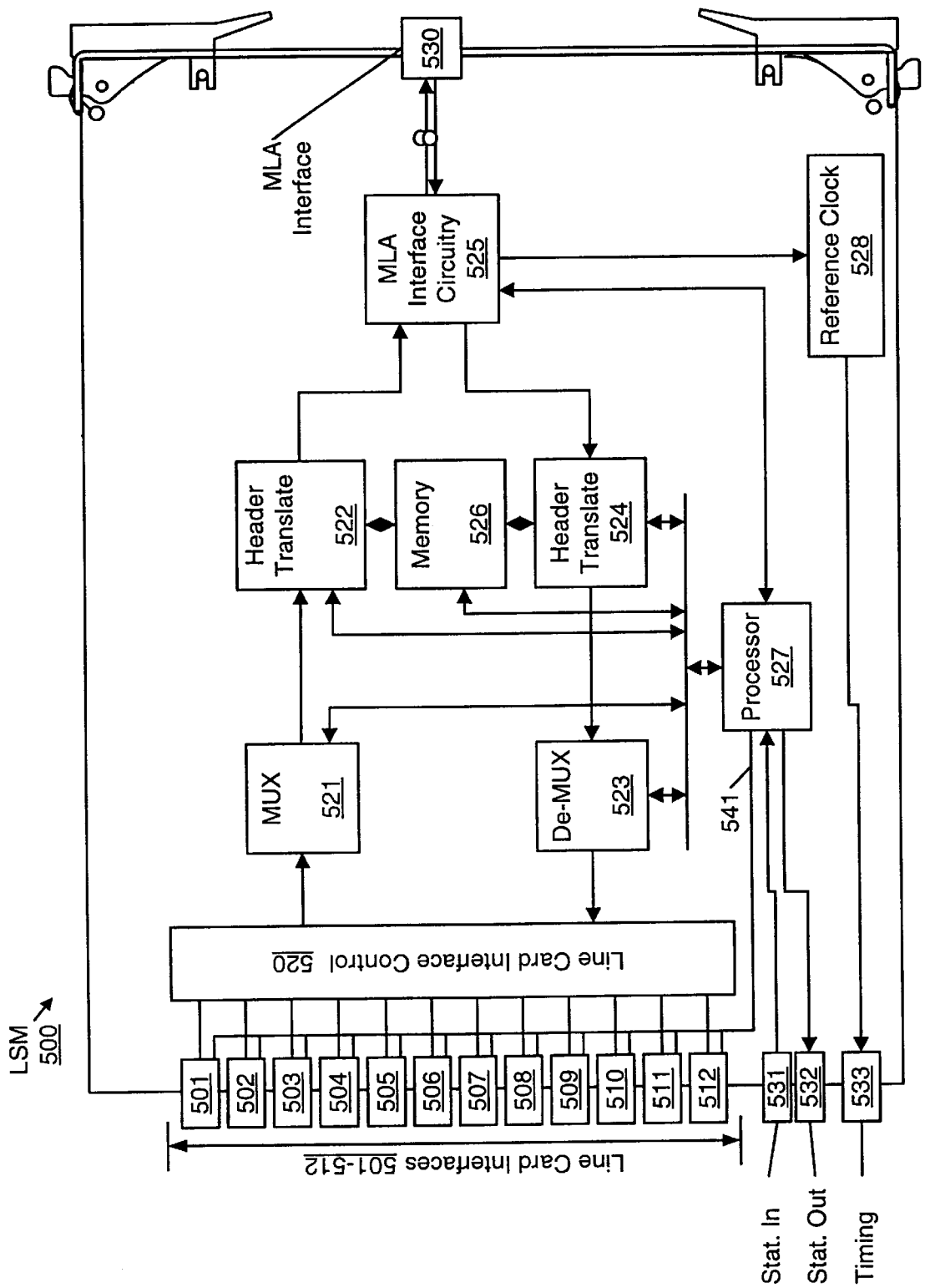
FIG. 5 is a functional diagram of a line card shelf multiplexer in accordance with the invention.

Line cards and LSMs include interfaces to couple signals to and from the backplane 400. FIG. 5 is a functional diagram of a LSM. The LSM 500 has line card interfaces 501–512 for communicating signals with line cards, a status input interface 531 for receiving a status signal from another LSM, a status output interface 532 for sending a status signal indicative of the LSM's current operating condition, a timing output interface 533 to output reference clock signals and an interface 530 to a master line adapter (MLA). The LSM includes, for example, circuitry 520–528 to process signals on interfaces 501–512 and 530–533.

Figure 6:
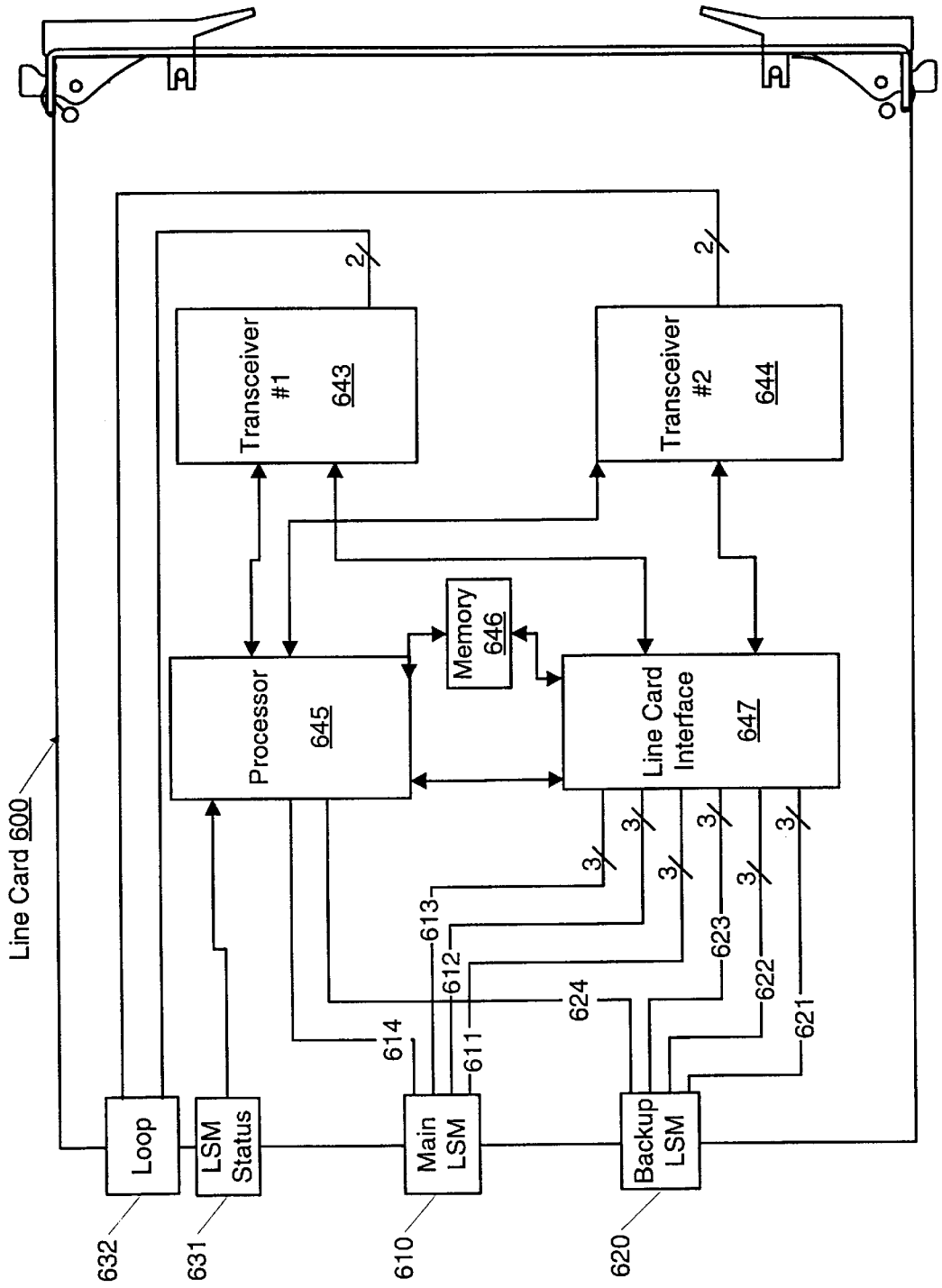
FIG. 6 is a functional diagram of a line card in accordance with the invention.

Line card interface control circuitry 520 processes ATM cell transfer signals exchanged over interfaces 501–512 and buffers ATM cells being sent to and received from line cards. Line card interface circuitry 520 may be implemented as a single integrated circuit to process signals on all of the line card interfaces or may be implemented as separate circuit components each processing, for example, signals on a single line card interface. Cells received by the interface control circuitry 520 from a line card may be temporarily buffered by the control circuitry 520. Received cells are subsequently selected by multiplexer circuitry 521 for processing by line card circuitry 522–527. Line card interfaces 501–512 also contain signal paths 541 over which HDLC formatted control data is exchanged between the LSM and line cards. Signals exchanged between the interface circuitry 520 and each of the line card interfaces 501–512 correspond to signals exchanged by the line card over signal paths 611 and 612 to a main LSM or over 621 and 622 to a backup LSM (FIG. 6).

Cells arriving at the interface control circuitry 520 may include operations, administration, maintenance, and provisioning (OAMP) data or may contain user-data. OAMP cells may be identified by the payload type indicator (PTI) field in the ATM cell header. The multiplexer circuitry 521 extracts OAMP cells and send them to the processor 527 while user-data cells are sent to header translation circuitry 522. Header translation circuitry 522 performs VPI/VCI header field translation and other ATM cell header manipulation functions. Header translation circuitry 522 may determine appropriate header manipulations based on, for example, programs and translation tables stored in RAM and ROM memory 526. Memory 526 may include header manipulation programs and translation tables that are stored by processor 527. After processing by header translation circuitry 522, ATM cells are directed to master line shelf adapter (MLA) interface circuitry 525. MLA interface circuitry 525 controls and buffers cells flowing from the address translation circuitry 522 to a MLA and controls, for example, ATM cell flow over a SONET OC-3c interface 530 between the LSM 500 and a MLA. Interface circuitry 525 may also insert OAMP cells from the processor 527 for transmission to a MLA and extract OAMP cells received from a MLA.

The LSM's MLA interface circuitry 525 may also receive ATM cells from a MLA. The MLA interface circuitry 525 may extract OAMP cells arriving from a MLA and send them to the processor 527. Data cells arriving at the interface 525 and destined to a line card are sent to header translation circuitry 524 which may perform ATM cell header manipulations. Header translation circuitry 524 performs VPI/VCI header field translation and other ATM cell header manipulation functions. Header translation circuitry 524 may determine appropriate header manipulations based on, for example, programs and translation tables stored in RAM and ROM memory 526. Following header translation, data cells may be sent to de-multiplexer circuitry 523. The de-multiplexer circuitry controls the flow of ATM cells to interface control circuitry 520. Processor 527 may also send OAMP cells to the de-multiplexer 523 for transfer to line cards. Interface control circuitry 520 then transmits the ATM cell to a line card.

Referring to FIGS. 4 and 5, when a LSM ("the main LSM") is coupled to main LSM slot 460, the main LSM's line card interfaces 501–512 are coupled to main LSM signal paths 421–432, its status output interface 532 is coupled to backplane signal path 480, and its status input interface 531 is coupled to backplane signal path 481. Correspondingly, when a LSM ("the backup LSM") is coupled to backup LSM slot 470, the backup LSM's line card interfaces 501–512 are coupled to backup LSM signal paths 441–452 and the backup LSM's status input interface 531 is coupled to backplane signal path 480 and its status output interface 532 is coupled to backplane signal path 481. Additionally, each LSM's timing output interface 533 is coupled to timing signal paths on the backplane 400 which connect to each one of the line cards 401–412.

FIG. 6 is a functional diagram of a line card. A line card 600 provides a signal termination point for subscriber loop data link connections. A line card 600 has a main LSM interface 610, a backup LSM interface 620, a LSM status input interface 631, and a subscriber loop data link interface 632. Each interface 610, 620, 631, 632 includes one or more signal lines over which electrically modulated signals are exchanged. To process signals on interfaces 610, 620, 631, and 632, a line card 600 includes line card circuitry such as a processor 645, line card to LSM backplane interface circuitry 647, and transceiver circuitry 643 and 644. The processor 645 may include integrated memory storage or may include interfaces to memory 646. The processor 645 may control line card to LSM communications, power management for line card circuitry, line card initialization, operations, maintenance, and provisioning. The processor 645 is, for example, a Motorola MC68360 processor. Backplane interface circuitry 647 receives and transmits signals over the line card shelf backplane 400, multiplexes and de-multiplexes ATM cells exchanged between the LSM and line card transceivers 643, 644 and may buffer cell traffic in memory 646. The backplane interface circuitry 647 is implemented using, for example, an Altera FLEX 10K programmable logic device, a field-programmable gate array, or other processing circuitry. Backplane interface circuitry 647 is coupled to transceiver circuitry 643, 644. Transceivers 643, 644 provide for modulation and demodulation of data over the subscriber loop interface 632 using a digital data modulation technology.

In various implementations, transceivers 643 and 644 implement, for example, Digital Subscriber Line (DSL), Integrated Services Digital Network (ISDN), Rate Adaptive Digital Subscriber Line (RADSL), High Bit Rate Digital Subscriber Line (HDSL), Asymmetric Digital Subscriber Line (ADSL) modulation, or other digital modulation technique. Line card circuitry 643–647 may be implemented in one or more integrated circuit chips, may include discrete circuit components, and may include additional functionality. In the line card 600, each transceiver 643 and 644 has a two-wire coupling to loop interface 632 over which both transmit and receive signals may be sent. In alternate implementations, transceivers 643 and 644 may have additional signal couplings to provide, for example, a transmission and reception of a four-wire service, or may provide a four-wire transceiver coupling for use with external hybrid circuitry that adapts the four-wire coupling to a two-wire loop interface. Still other transceiver-to-loop signal coupling arrangements may be used depending on the particular transceiver type and line card application.

Referring to FIGS. 4 and 6, when a line card 600 is coupled to one of line card slots 401–412, the line card's main LSM interface 610 is coupled to the main LSM by one of backplane signal paths 421–432 and the line card's backup LSM interface 620 is coupled to the backup LSM by one of backplane signal paths 441–452. Additionally, the line card's LSM status input interface 631 is coupled to the LSM status signal path 481 and the line card's subscriber loop interface 632 is coupled to a subscriber loop signal path. The subscriber loop signal paths provide connections to, for example, a telephone company central office main distribution frame and thereby to network access equipment at a subscriber's premises.

The described coupling between line cards, LSMs, and backplane signal paths provides each line card with dedicated connections to two LSMs. For example, when a line card 600 is inserted in line card slot 401, the line card's main LSM interface 610 is coupled to main LSM line card interface 501 by backplane signal paths 421, the line card's backup LSM interface 620 is coupled to backup LSM line card interface 501 by backplane signal paths 441, the line card's LSM status input interface 631 is coupled to the backup LSM's status output interface 532 by backplane signal paths 481 and the line card's subscriber loop interface 632 is coupled to subscriber loop signal paths. Similarly, when a line card 600 is inserted in line card slot 402, the line card's main LSM interface 610 is coupled to main LSM line card interface 502 by backplane signal paths 422, the line card's backup LSM interface 620 is coupled to backup LSM line card interface 502 by backplane signal paths 442, the line card's LSM status input interface 631 is coupled to the backup LSM's status interface 532 by backplane signal paths 481 and the line card's subscriber loop interface 632 is coupled to subscriber loop signal paths. Line cards inserted in slots 403–412 are similarly connected to main LSM interfaces 503–512, backup LSM interfaces 503–512, backup LSM status output interface 532, and subscriber loop connections.

A line card's main LSM interface 610 includes LSM to line card cell transfer signal lines 611 and line card to LSM cell transfer signal lines 612. Signal lines 611 and 612 are coupled to complementary signal lines at line card interfaces 501–512 (FIG. 5) of a LSM by backplane signal paths 421–432 (FIG. 4). Signals modulated over signal lines 611 are used to receive ATM cells sent from the main LSM. Signals modulated over signal lines 612 are used to send ATM cells to the main LSM. Signals exchanged over signal lines 611 and 612 are modulated in reference to a clock signal that is, for example, a 12.5 megahertz (MHz) clock signal received from a LSM, and signals may be asserted or de-asserted on the rising edge of a clock pulse and sampled on the falling edge of the clock pulse.

The LSM to line card cell transfer signal lines 611 includes a Line Card Receive Ready (LC-RR) signal line, a LSM Send Ready (LSM-SR) signal line, and a receive LSM Data (LSM-DATA) signal line over which, respectively, a LC-RR, LSM-SR, and LSM-DATA signal are modulated. The line card to LSM cell transfer signal lines 612 includes a Line Card Send Ready (LC-SR) signal line, a LSM Receive Ready (LSM-RR) signal line, and a transmit Line Card Data (LC-DATA) signal line over which, respectively, a LC-SR, LSM-RR, and LC-DATA signal are modulated.

Data transfers from a LSM to a line card include line card port identification information (a "port address"). A port address is a fixed value associated with a particular line card transceiver or subscriber loop connection. For example, a line card supporting two subscriber loops has port addresses "P1" and "P2" that are associated, respectively, with the first and second subscriber loop at the line card. Each subscriber loop at a particular line card has an associated port address that is unique with respect to the port addresses of other subscriber loops at that line card. However, port addresses at one line card need not be unique with respect to port addresses at another line card. In a data transfer between a LSM and a line card, a line card port address may be identified by, for example, additional data bytes added to the ATM cell or by information in a modified (non-standard) cell header. Unlike VPI/VCI addresses which are dynamically associated with a transceiver, port address are permanently assigned (that is, they are static). Thus, the use of port addresses can simplify cell routing through a line card by simplifying the processing and storage of cell routing data.

Figure 7A:
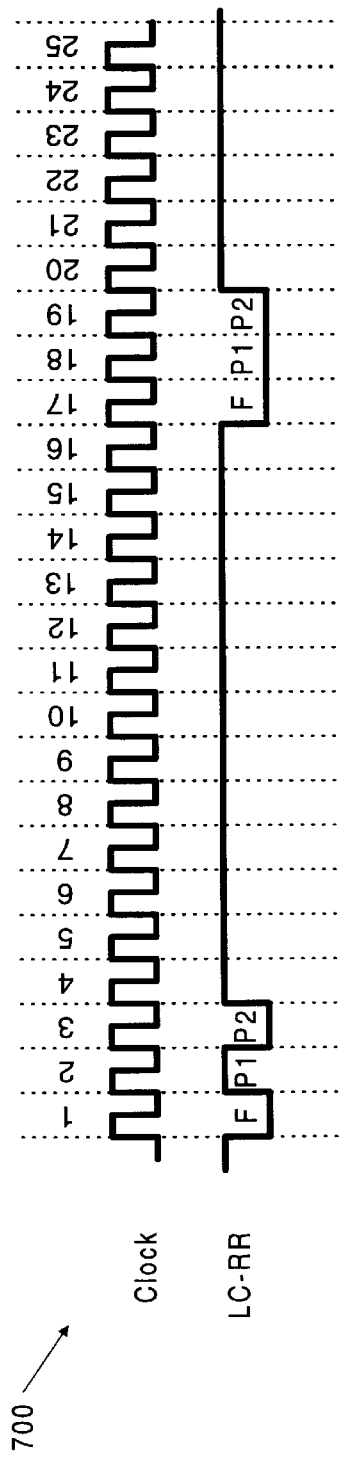
FIGS. 7A, 7B and 7C are signal timing diagrams in accordance with the invention.
Figure 7B:
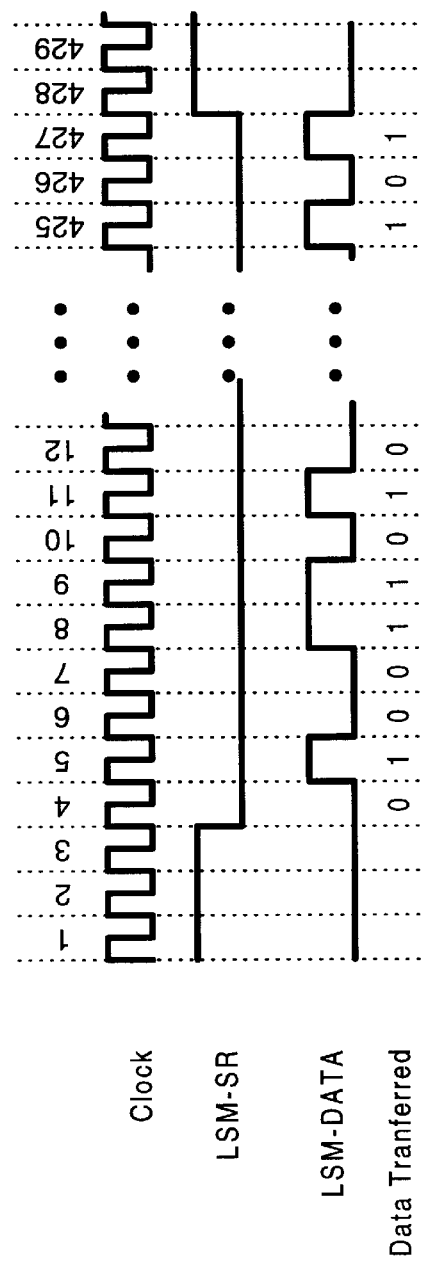

ATM cells are transferred from a LSM to a line card by the exchange of the LC-RR, LSM-SR, and LSM-DATA signals on the LSM to line card cell transport signal lines 611. FIGS. 7A and 7B illustrate timing and modulation of the LC-RR, LSM-SR, and LSM-DATA signals. The LC-RR signal is sent from the line card to the LSM to indicate line card ports that are ready to receive ATM cell transfers. FIG. 7A is a LC-RR signal timing diagram for a line card supporting two line card ports. The LC-RR signal is modulated to periodically transmit a framing indicator and port status information from the line card to the LSM. The framing indicator is sent by asserting the LC-RR signal for one clock cycle at, for example, sixteen clock cycle intervals. During each clock cycle following the framing indicator, port status information may be sent from the line card to the LSM. Port status information is sent by asserting or de-asserting the LC-RR signal during a clock period that is unique for each port on the line card.

Referring to FIG. 7A, in the exemplary LC-RR timing diagram 700, the LC-RR signal is asserted when in a low voltage state. At clock 1, a framing indicator "F" is sent by asserting the LC-RR signal. At clock 2, the LC-RR signal is de-asserted indicating that the first line card port "P1" is not ready to receive data. At clock 3, the LC-RR signal is asserted indicating that the second line card port "P2" is ready to receive data. During the clock periods between the port status information and the subsequent framing indicator, i.e., periods 4 to 16, the LC-RR signal remains de-asserted. At clock 17 the framing indicator is again asserted and followed, at clocks 18 and 19, by updated port information.

A line card supporting more than two subscriber loops will typically have additional ports. For example, a line card supporting four subscriber loops may receive data from the LSM at four line card ports. A line card with more than two ports will convey additional port status information following the illustrated 'P2' indicator period in FIG. 7A. In an alternative line card implementation, VPI/VCI information, rather than a line card port identifier, may be used to identify the particular destination subscriber loop.

When a line card port is ready to receive an ATM cell, a cell may be transferred using the LSM-SR and LSM-DATA signals. FIG. 7B is an exemplary signal timing diagram illustrating states of the LSM-SR and LSM-DATA signals during an ATM cell transfer from the LSM to the line card. When a LSM is ready to send a cell to a waiting line card port, the LSM asserts (low) the LSM-SR signal and simultaneously begins modulating data over the interface 611 using the LSM-DATA signal. For example, at clock 4, the LSM asserts the LSM-SR signal and begins a serial transfer of a data cells by modulating the LSM-DATA signal. To send a '1' bit value, the LSM-DATA signal is asserted (high) during a clock cycle, and to send a '0' bit value the LSM-DATA signal is de-asserted (low) during a clock cycle. To send a 53-byte (424 bit) ATM cell, the LSM-DATA signal is modulated for a 424 clock cycle period. After transmission of the ATM cell, the LSM-SR signal is de-asserted. When the LSM-SR signal is de-asserted, the LSM-DATA signal is not sampled.

Figure 7C:
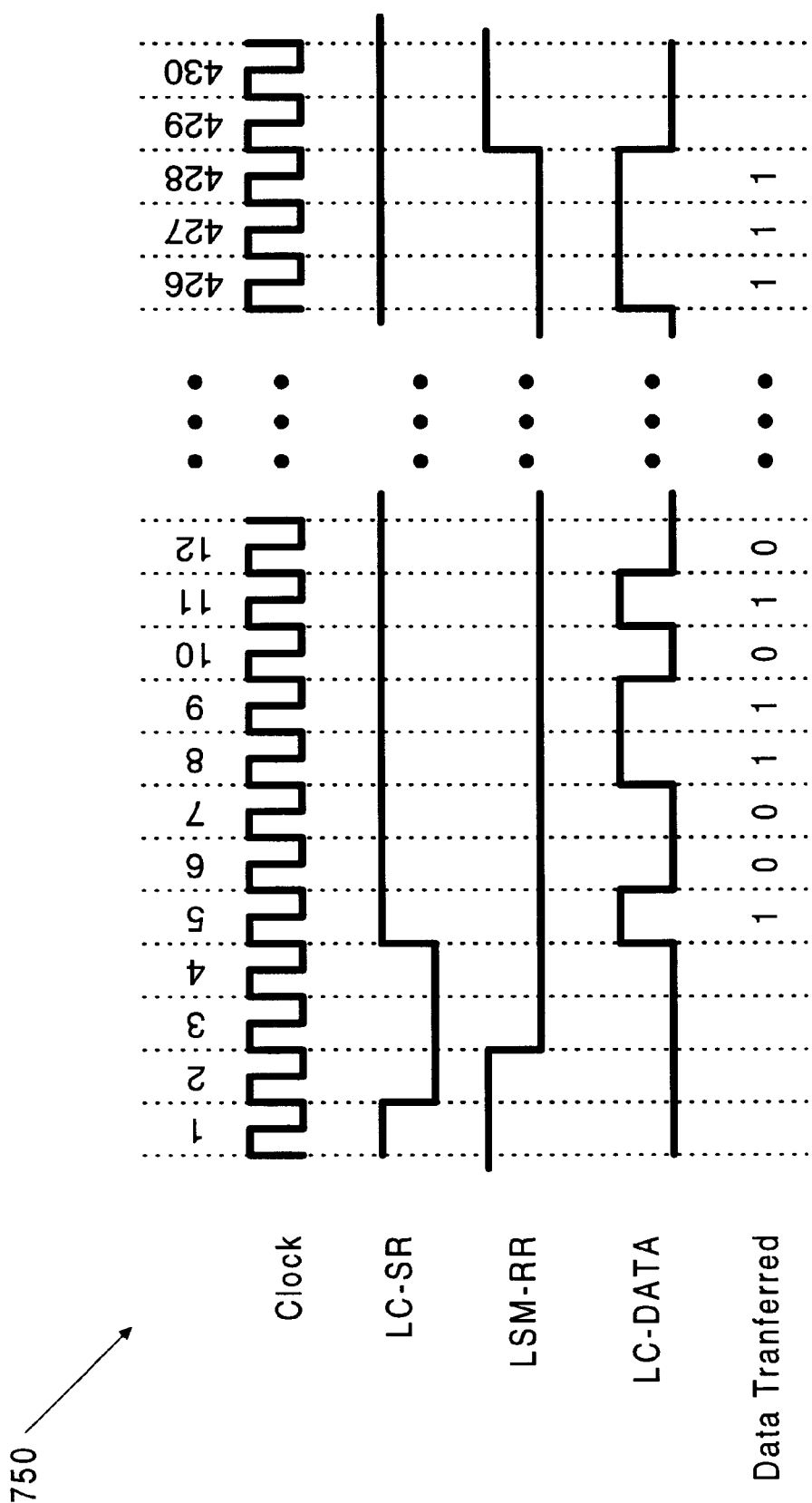

ATM cells are transferred from the line card to the LSM by the exchange of LC-SR, LSM-RR, and LC-DATA signals on the line card to LSM cell transfer signal lines 612. FIG. 7C is a line card to LSM cell transport interface signal timing diagram. The signal timing diagram 750 illustrates timing and modulation of LC-SR, LSM-RR, and LC-DATA signals exchanged during an ATM cell transfer from the line card to a LSM. At clock cycle 2, the line card indicates that it is ready to transfer a data cell to a LSM by asserting (low) the LC-SR signal. At clock cycle 3, the LSM indicates that it is ready to accept data from the line card by asserting (low) the LSM-RR signal. Note that the LSM need not assert the LSM-RR signal immediately after receipt of the LC-SR signal, but rather the LSM may delay assertion of LSM-RR until it is ready to receive the data transfer. Following the LSM's assertion of the LSM-RR signal, the line card waits for two clock cycles (clock 3 and clock 4) before the start of data transfer. This two clock cycle delay facilitates backplane signal timing and LSM to line card synchronization. In alternative implementations, this two clock cycle delay period may be reduced or increased depending on, for example, backplane signal propagation characteristics and required LSM and line card circuitry response times. Following the two clock cycle delay period, the line card begins a serial transfer of data by modulating the LC-DATA signal. For example, FIG. 7C shows the transfer of a '1' bit during clock cycles 5, 8, 9, 11, 426, 427, and 428 by asserting (high) the LC-DATA signal and the transfer of a '0' bit during clock cycles 6, 7, 10, and 12 by de-asserting the LC-DATA signal. In alternative embodiments, the LSM-SR may be de-asserted once a cell transfer has begun, for example, at clock cycle 5 of FIG. 7B.

Figure 8:
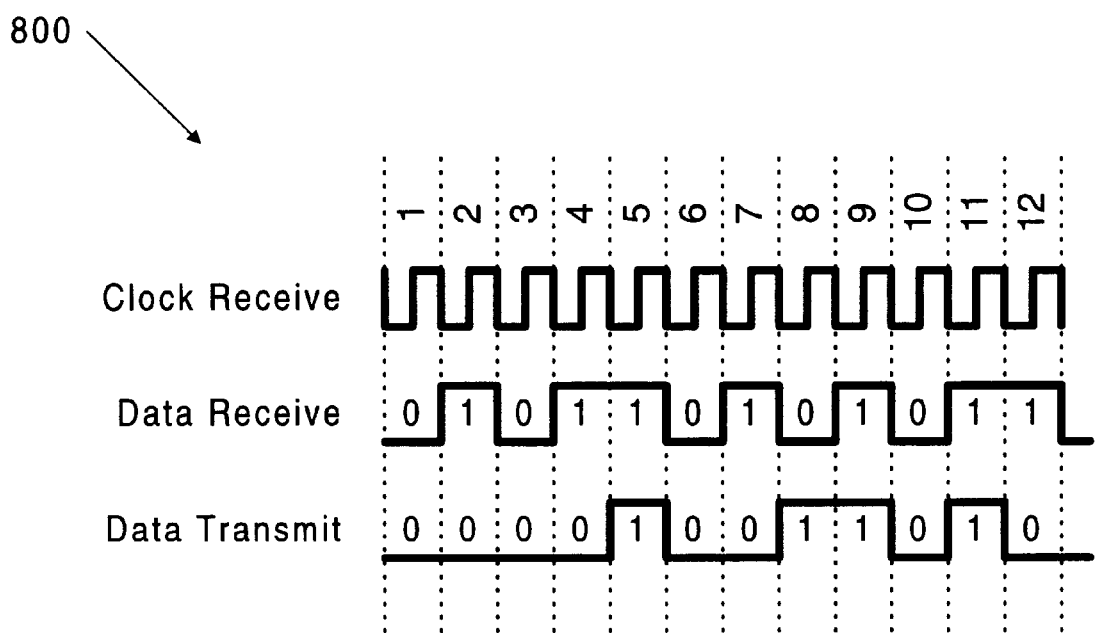
FIG. 8 is a signal timing diagram in accordance with the invention.

Referring to FIGS. 6 and 8, a line card's main LSM interface 610 includes control link signal lines 613. Line card operations, administration, maintenance and provisioning (OAMP) functions can be controlled by data sent over the control link signal lines 613 between the line card and the main LSM. The control link signal lines 613 include a clock signal line, a data receive signal line, and a data transmit signal line. The line card sends data to the LSM in serial fashion by modulating a signal over a data transmit signal line and receives modulated data from the LSM over a data receive signal line. Signals exchanged over the data receive and data transmit signal lines are, for example, asserted or de-asserted on the falling edge of a 64 kilohertz (KHz) clock pulse received on the clock receive signal line and are sampled on the rising edge of a received clock pulse. The format for the data exchanged on the control link signal lines 613 may conform to the Open Systems Interconnection (OSI) High-level Data Link Control (HDLC) protocol. The HDLC protocol is described in ISO/IEC 3309:1991 (E), *Information Technology—Telecommunications and Information Exchange Between Systems—High-level Data Link Control (HDLC) procedures—Frame Structure*, International Organization for Standardization, Fourth Edition, 1991-06-01. A line card's main LSM interface 610 may also include clock signal lines 614. The clock signal lines include, for example, a 12.5 MHz clock signal line and a 8 KHz telephone network reference timing signal line received from the main LSM. Signals exchanged over clock signal lines 614 may be used to time data transmission over signal lines 611 and 612.

A line card includes a backup LSM interface 620. The backup LSM interface 620 includes signal lines 621–624 that duplicate signal lines 611–614 of main LSM interface 610. Interface 620 is used to communicate with a backup LSM in case of a main LSM failure. A line card 600 determines the appropriate interface 610 or 620 for signal transmission and reception based on a LSM status signal received at LSM status interface 631. The LSM status signal is, for example, a binary signal having a high voltage state to indicate that the line card should use its main LSM interface 610 and a low voltage state to indicate that the line card should use its backup LSM interface 620.

In an exemplary implementation, line cards and line shelf multiplexers may be interconnected by a line card shelf backplane that includes twenty-four line card slots and two LSM slots. Each line card slot may include electrical connectors manufactured by FCI/Burndy as part number HM1W53DPR000H9. Line card slots receive corresponding line card mating connectors. Each LSM slot may include two HM1W53DPR000H9 connectors and one HM1W52DPR000H9 connector and receive LSM cards having three corresponding mating connectors. Line card shelf backplane interconnections for this exemplary implementation are detailed in Table 1. In Table 1, the main LSM slot includes connectors labeled L325, L425, and L525, the backup LSM slot includes connectors labeled L326, L426, and L526, and the twenty-four line card slots include connectors labeled L201 through L224, respectively. Connectors L325, L425, L326, L426, and L201 through L224 have, for example, FCI/Burndy connectors having 120 electrical contacts ("pins") and part number HM1W53DPR000H9. Connector L525 and L526 are FCI/Burndy connectors having 60 pins and part number HM1W52DPR000H9.

In Table 1, a three digit number preceded by the letter "L" designates a line card shelf connector. Connector pins can be electrically coupled by backplane signal lines to other connector pins. Table 1 describes the interconnections between connector pins. In Table 1, the "Connection" column lists one or more pins identified by connector designations followed by a hyphen and a comma-separated list of connector pin identifiers. A "pin" is identified by a two-digit number preceded by "A", "B", "C", "D", or "E" conforming to FCI/Burndy standard connector numbering practices. Pins identified in the "Connection" column are coupled by backplane signal lines to corresponding pins as designated in the "Connection To" column. In various implementations, alternate connectors may be used and each connector may include additional interconnections such as electrical power, signal grounding, and signals to other line card shelf components.

TABLE 1

| Connection | Connection To | Function |
| --- | --- | --- |
| L425-A17, B17, D17, E17, A10, B10, D10, E10, A3, B3, D3, E3; L325-A20, B20, D20, E20, A13, B13, D13, E13, A6, B6, D6, E6 | C23 of line card connectors L201–L224, respectively. | LC-DATA signal from line cards 01–24, respectively, to main LSM. |
| L425-A18, B18, D18, E18, A11, B11, D11, E11, A4, B4, D4, E4; L325-A21, B21, D21, E21, A14, B14, D14, E14, A7, B7, D7, E7 | C24 of line card connectors L201–L224, respectively. | LSM-RR signal from main LSM to line cards 01–24, respectively. |
| L425-A16, B16, D16, E16, A9, B9, D9, E9, A2, B2, D2, E2; L325-A19, B19, D19, E19, A12, B12, D12, E12, A5, B5, D5, E5 | C22 of line card connectors L201–L224, respectively. | LC-SR signal from line cards 01–24, respectively, to main LSM. |
| L425-A14, B14, D14, E14, A7, B7, D7, E7; L325-A24, B24, D24, E24, A17, B17, D17, E17, A10, B10, D10, E10, A3, B3, D3, E3 | C20 of line card connectors L201–L224, respectively. | LSM-DATA signal from main LSM to line cards 01–24, respectively. |
| L425-A15, B15, D15, E15, A8, B8, D8, E8, A1, B1, D1, E1; L325-A18, B18, D18, E18, A11, B11, D11, E11, A4, B4, D4, E4 | C21 of line card connectors L201–L224, respectively. | LSM-SR signal from main LSM to line cards 01–24, respectively. |
| L425-A13, B13, D13, E13, A6, B6, D6, E6; L325-A23, B23, D23, E23, A16, B16, D16, E16, A9, B9, D9, E9, A2, B2, D2, E2 | C19 of line card connectors L201–L224, respectively. | LC-RR signal from line cards 01–24, respectively, to the main LSM. |
| L425-A12, B12, D12, E12, A5, B5, D5, E5; L325-A22, B22, D22, E22, A15, B15, D15, E15, A8, B8, D8, E8, A1, B1, D1, E1 | C18 of line card connectors L201–L224, respectively. | 12.5 MHz clock signal from main LSM to line cards 01–24, respectively. |

TABLE 1-continued

| Connection | Connection To | Function |
|---|---|---|
| L525-A12, B12, D12, E12, A9, B9, D9, E9, A6, B6, D6, E6, A3, B3, D3, E3; L425-A24, B24, D24, E24, A21, B21, D21, E21 | E24 of line card connectors L201–L224, respectively. | Control link data from main LSM to line cards 01–24, respectively. |
| L525-A11, B11, D11, E11, A8, B8, D8, E8, A5, B5, D5, E5, A2, B2, D2, E2; L425-A23, B23, D23, E23, A20, B20, D20, E20 | E23 of line card connectors L201–L224, respectively. | Control link clock from main LSM to line cards 01–24, respectively. |
| L525-A10, B10, D10, E10, A7, B7, D7, E7, A4, B4, D4, E4, A1, B1, D1, E1; L425-A22, B22, D22, E22, A19, B19, D19, E19 | E22 of line card connectors L201–L224, respectively. | Control link data from line cards 01–24, respectively, to the main LSM. |
| L225-B15 | E15 of line card connectors L201–L212. | 8 kHz reference dock signal from main LSM to line cards 01–12. |
| L225-B16 | E15 of each line card L213–L224. | 8 kHz reference clock signal from main LSM to line cards 13–24. |
| L426-A17, B17, D17, E17, A10, B10, D10, E10, A3, B3, D3, E3; L326-A20, B20, D20, E20, A13, B13, D13, E13, A6, B6, D6, E6 | A23 of line card connectors L201–L224, respectively. | LC-Data from line cards 01–24, respectively, to backup LSM. |
| L426-A18, B18, D18, E18, A11, B11, D11, E11, A4, B4, D4, E4; L326-A21, B21, D21, E21, A14, B14, D14, E14, A7, B7, D7, E7 | A24 of line card connectors L201–L224, respectively. | LSM-RR from backup LSM to line cards 01–24, respectively. |
| L426-A16, B16, D16, E16, A9, B9, D9, E9, A2, B2, D2, E2; L326-A19, B19, D19, E19, A12, B12, D12, E12, A5, B5, D5, E5 | A22 of line card connectors L201–L224, respectively. | LC-SR from line cards 01–24, respectively, to backup LSM. |
| L426-A14, B14, D14, E14, A7, B7, D7, E7; L326-A24, B24, D24, E24, A17, B17, D17, E17, A10, B10, D10, E10, A3, B3, D3, E3 | A20 of line card connectors L201–L224, respectively. | LSM-DATA from backup LSM to line cards 01–24, respectively. |
| L426-A15, B15, D15, E15, A8, B8, D8, E8, A1, B1, D1, E1; L326-A18, B18, D18, E18, A11, B11, D11, E11, A4, B4, D4, E4 | A21 of line card connectors L201–L224, respectively. | LSM-SR from backup LSM to line cards 01–24, respectively. |
| L426-A13, B13, D13, E13, A6, B6, D6, E6; L326-A23, B23, D23, E23, A16, B16, D16, E16, A9, B9, D9, E9, A2, B2, D2, E2 | A19 of line card connectors L201–L224, respectively. | LC-RR from line cards 01–24, respectively, to the backup LSM |
| L426-A12, B12, D12, E12, A5, B5, D5, E5; L326-A22, B22, D22, E22, A15, B15, D15, E15, A8, B8, D8, E8, A1, B1, D1, E1. | A18 of line card connectors L201–L224, respectively. | 12.5 MHz clock signal from backup LSM to line cards 01–24, respectively. |
| L526-A12, B12, D12, E12, A9, B9, D9, E9, A6, B6, D6, E6, A3, B3, D3, E3; L426-A24, B24, D24, E24, A21, B21, D21, E21 | E20 of line card connectors L201–L224, respectively. | Serial control link from backup LSM to line cards 01–24, respectively. |
| L526-A11, B11, D11, E11, A8, B8, D8, E8, A5, B5, D5, E5, A2, B2, D2, E2; L426-A23, B23, D23, E23, A20, B20, D20, E20 | E19 of line card connectors L201–L224, respectively. | Serial control link clock from backup LSM to line cards 01–24, respectively |
| L526-A10, B10, D10, E10, A7, B7, D7, E7, A4, B4, D4, E4, A1, B1, D1, E1; L426-A22, B22, D22, E22, A19, B19, D19, E19 | E18 of line card connectors L201–L224, respectively. | Serial control link from line cards 01–24, respectively, to the backup LSM. |
| L226-B15 | E14 of line card connectors L201–L212. | 8 kHz reference clock signal from backup LSM to line cards 01–12. |
| L226-B16 | E14 of each line card L213–L224. | 8 kHz reference clock signal from backup LSM to line cards 13–24. |
| L225-B13 | L226-B13 | LSM main status output to backup LSM status input. |
| L226-B14 | L225-B14; E16 of each line card L201–L224 | LSM backup status output to main status input and status input of line cards 01–24. |

Figure 9:
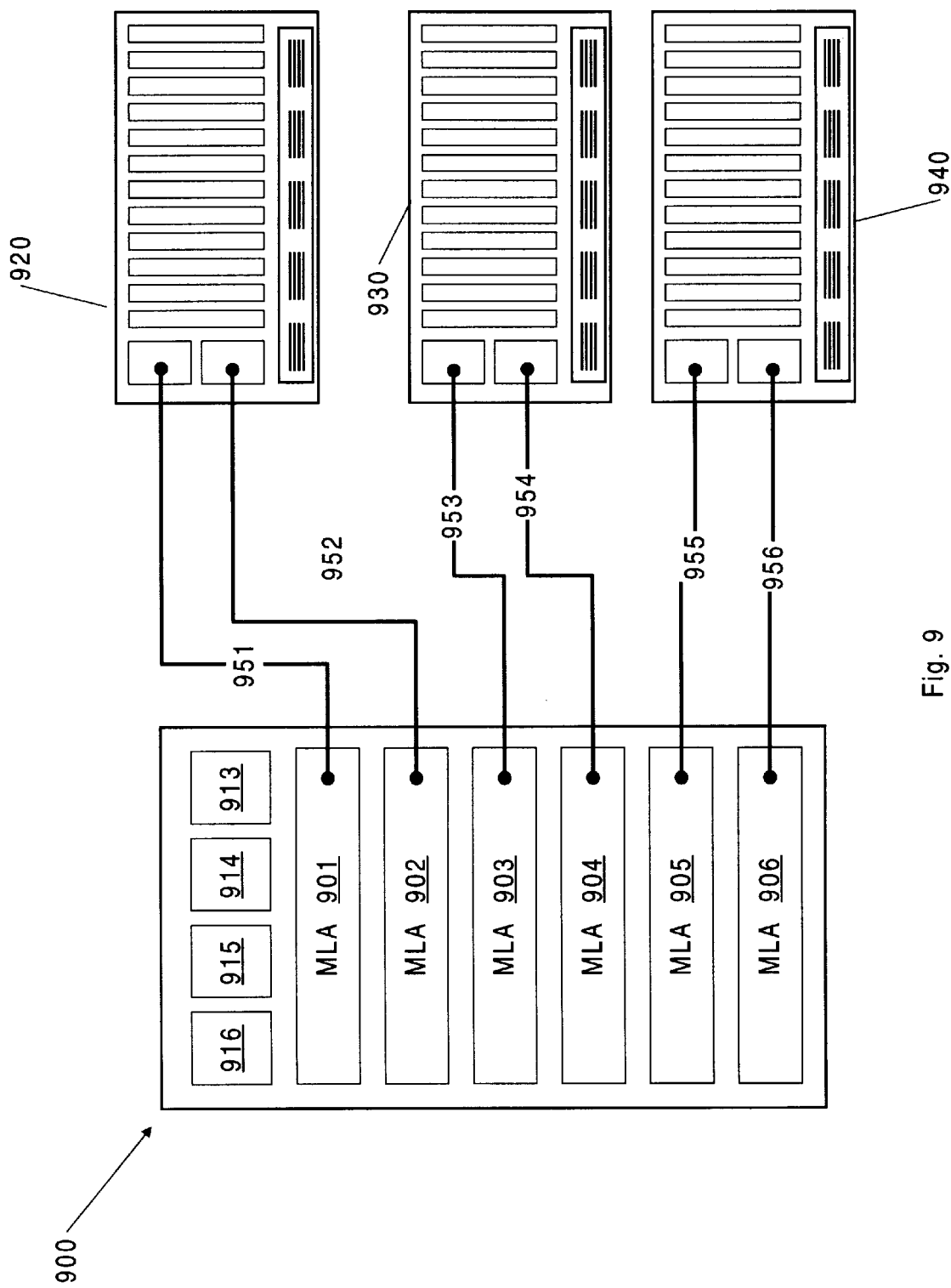
FIG. 9 is master control shelf and three line card shelves in accordance with the invention.

In addition to exchanging data with line cards, a LSM may exchange data with a master line adapter (MLA) at a master control shelf (MCS). Referring back to FIG. 5, a LSM 500 has an interface 530 to connect the LSM, and thus the line card shelf 300 (FIG. 3), to a master line adapter (MLA). FIG. 9 illustrates three line card shelves 920, 930, 940 connected to a MCS 900 by LSM to MLA connections 951–956. The connections 951–956 are, for example, SONET OC-3c fiber-optic connections. A MCS 900 has, for example, six master line adapter (MLA) cards 901–906, a main trunk card 913, a backup trunk card 914, a main master control processor (main MCP) 915, and a backup master control processor (backup MCP) 916.

A master control shelf 900 routes ATM cells between trunk cards 913 and 914 and MLAs 901–906 and between MLAs 901–906 and LSMs at line card shelves 920, 930, 940. Each MLA to LSM connection 951–956 is, for example, a fiber optic SONET OC-3c interface between a MLA and a LSM. In addition, each trunk card 913 and 914 at the MCS 900 has, for example, a T3 interface to an ATM network. A MCS includes a main MCP 915 and a backup MCP 916. The main and backup MCP provide configuration and control information to trunk cards 913 and 914, to MLAs 901–906, to LSMs and to line cards. Control and configuration information exchanged between a MCP and the MLAs, trunk cards, LSMs, and line cards includes OAMP data such as VPI/VCI header translation information, software updates, system test data, and system monitoring data.

Figure 10:
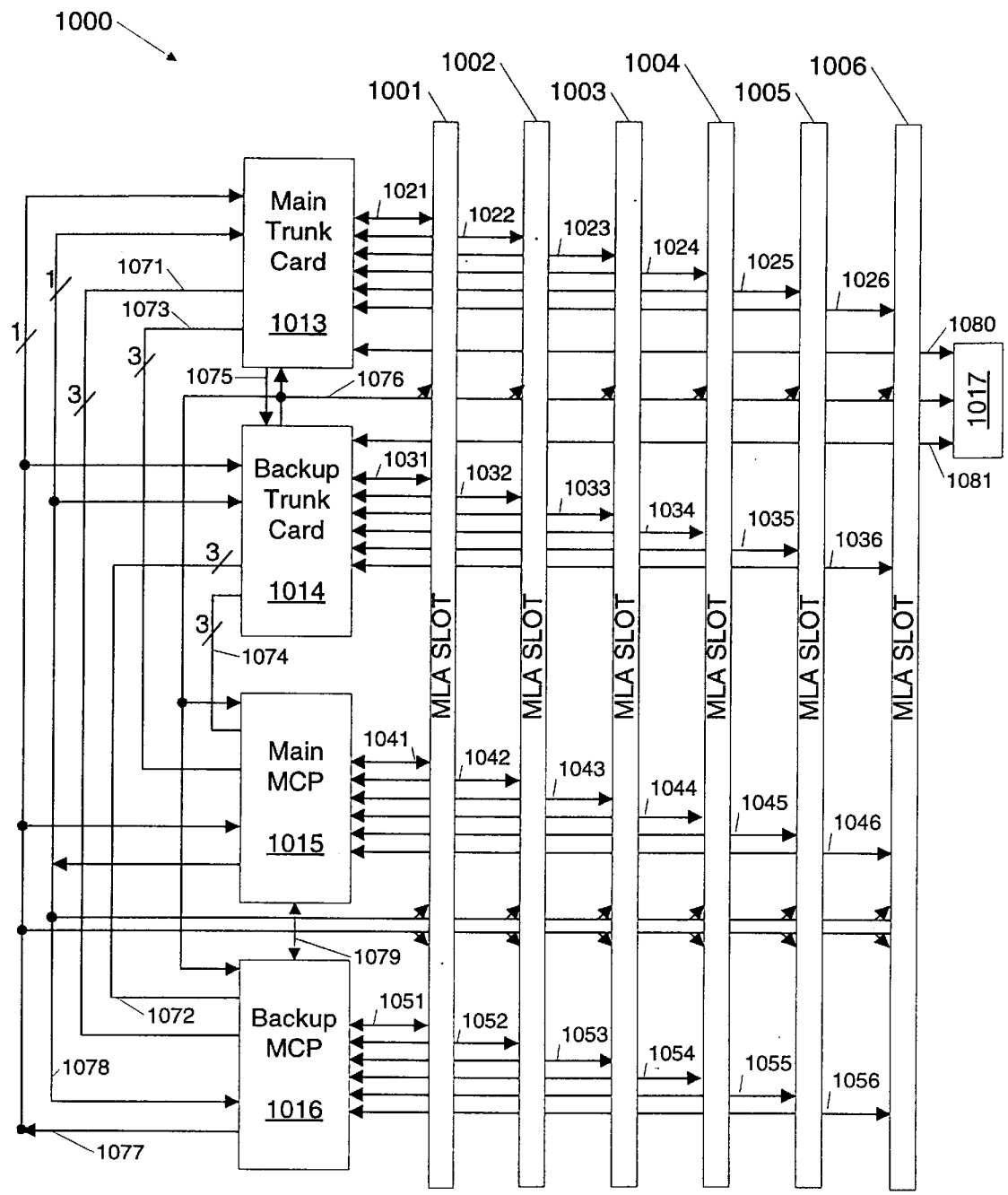
FIG. 10 is a master control shelf backplane in accordance with the invention.

Trunk cards, MLAs, and MCPs are interconnected by a MCS backplane. FIG. 10 is a diagram of a MCS backplane. The backplane 1000 has six MLA slots 1001–1006, a main trunk card slot 1013, a backup trunk card slot 1014, a main MCP slot 1015 and a backup MCP slot 1016, and trunk interface 1017. MLA slots 1001–1006, trunk card slots 1013 and 1014 and MCP slots 1015 and 1016 are, respectively, the points at which MLAs, trunk cards, and MCPs are coupled to backplane signal paths. Trunk interface 1017 is the point at which an external trunk, such as a standard telephony T3 trunk, or a SONET OC-3c fiber optic trunk is coupled to the backplane. The trunk interface 1017 includes switching circuitry, such as a electromagnetic relay, transistor switching circuitry, or optical switching elements and receives a trunk card status signal from the backup trunk card over status signal path 1076. Trunk interface 1017 couples either the main trunk card or the backup trunk card to the external trunk based on the status signal on signal path 1076. The MCS backplane may also include slots to connect main and backup network management processors (NMPs) (not shown). NMPs may be used to connect the MCS to an external network management system and to exchange OAMP data between LSMs, trunk cards, and MLAs. Additionally, a MCS may include slots for a main and a backup high-quality clock reference (HQR) signal generator. The main and the backup HQR provides a clock signal timing synchronized to an external network clock reference. Signals from the main and backup HQR may be sent over backplane signal paths to each LSM, MLA, and trunk card.

Each MLA slot is connected by one of signal paths 1021–1026 to the main trunk card slot 1013, by one of signal paths 1031–1036 to the backup trunk card slot 1014, by one of signal paths 1041–1046 to the main MCP slot 1015 and by one of signal paths 1051–1056 to the backup MCP slot 1016. For example, MLA slot 1001 is connected to the main trunk card slot 1013 by signal paths 1021, to the backup trunk card slot 1014 by signal paths 1031, to the main MCP by signal paths 1041 and to the backup MCP by signal paths 1051. Similarly, MLA slot 1002 is connected to the main trunk card slot 1013 by signal paths 1022, to the backup trunk card slot 1014 by signal paths 1032, to the main MCP by signal paths 1042 and to the backup MCP by signal paths 1052. Each of signal paths 1021–1026 and 1031–1036 includes twenty conductive signal lines for the parallel transmission of ATM cells between a MLA and trunk card and, for example, 25 MHz, 19.44 MHz and 8 KHz trunk card to MLA clock signal lines. Signal paths 1041–1046 and 1051–1056 each include three conductive signal lines for the serial transmission of control data between a MLA and a MCP.

Figure 11:
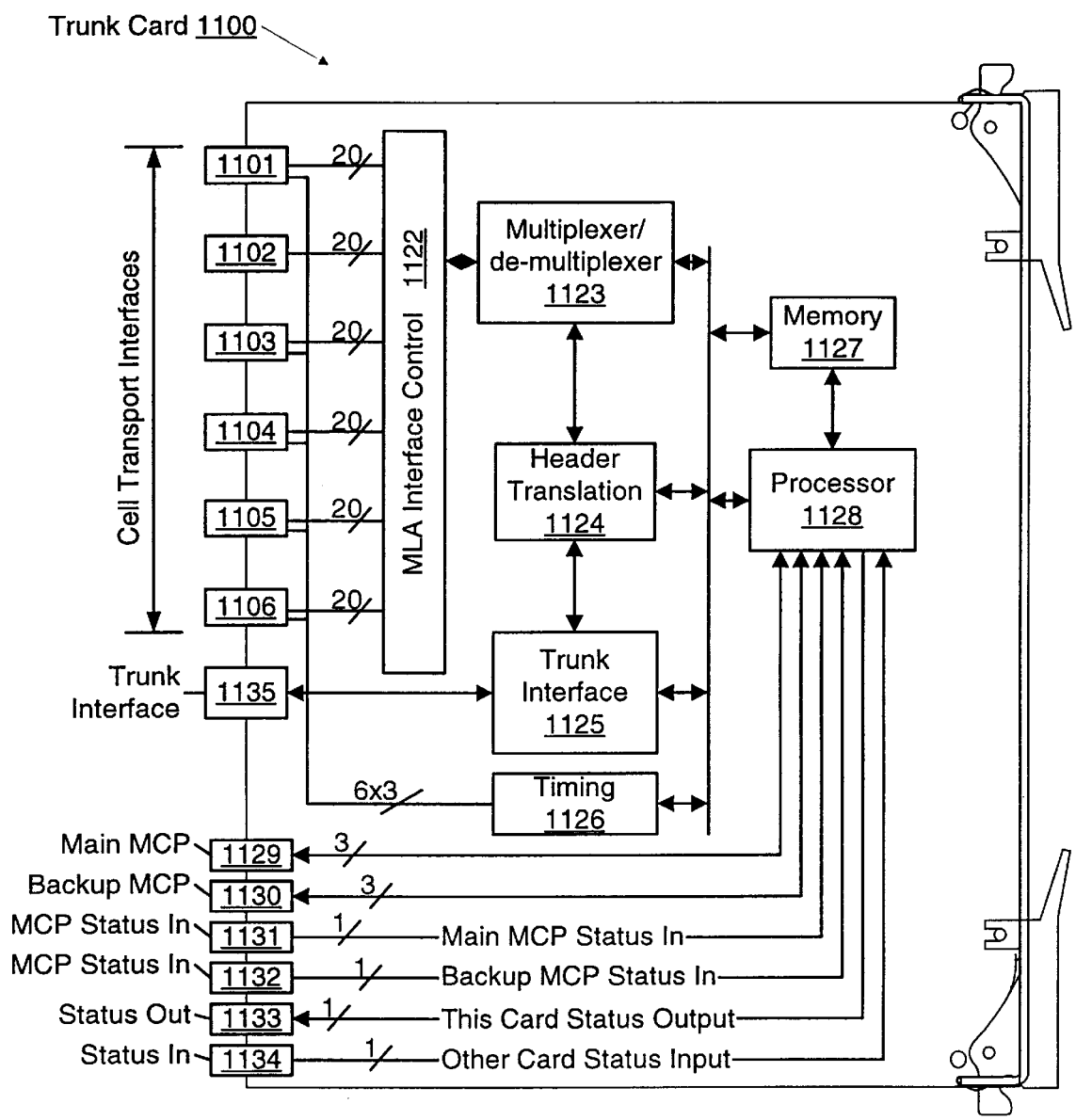
FIG. 11 is a trunk card in accordance with the invention.

FIG. 11 is a functional diagram of a trunk card. A trunk card 1100 includes cell transport interfaces 1101–1106, a trunk interface 1135, a main MCP interface 1129, a backup MCP interface 1130, a main MCP status input interface 1131, a backup MCP status input interface 1132, a trunk card status output interface 1133 and a trunk card status input interface 1134. A trunk card's cell transport interfaces 1101–1106 each include twenty conductive signal lines for ATM cell transfer. Ten of the twenty cell transfer signal lines are used to transport ATM cells from the trunk card to a MLA, and the remaining ten are used to transport ATM cells from a MLA to the trunk card. Each cell transport interface 1101–1106 may also include three signal lines to timing circuitry 1126. The timing circuitry 1126 sends clock signals over the cell transport interfaces 1101–1106 to enable proper timing of data transmission and reception.

A trunk card's main MCP interface 1129 and backup MCP interface 1130 are used to exchange trunk card operations, administration, maintenance and provisioning (OAMP) data with, respectively, a main MCP in backplane slot 1015 and a backup MCP in backplane slot 1016. The trunk card processor 1128 determines the appropriate MCP interface 1129 or 1130 for control signal exchange based on MCP status information received at the main MCP status input 1131 and backup MCP status input 1132. Main MCP status input 1131 receives, for example, a binary signal with a high voltage value indicating that the main MCP is active and a low voltage value indicating that the main MCP is inactive. Similarly, backup MCP status input 1132 receives, for example, a binary signal with a high voltage value indicating that the backup MCP is active and a low voltage value indicating that the backup MCP is inactive.

A trunk card includes, for example, circuitry 1122–1128 to process signals on interfaces 1101–1106 and on interfaces 1129–1135. MLA interface control circuitry 1122 processes ATM cell transfer signals exchanged over interfaces 1101–1106 and controls the transmission of ATM cells between the trunk card and MLAs. Interface control circuitry 1122 may include ATM cell buffers to temporarily store cells received from, or being transmitted to, MLAs over interfaces 1101–1106. Cell multiplexer/de-multiplexer circuitry 1123 exchanges ATM cells with the MLA interface control circuitry 1122 and determines the flow of ATM cells between the control circuitry 1122 and header translation circuitry 1124. Additionally, the multiplexer/de-multiplexer circuitry 1123 may extract OAMP cells arriving from the trunk interface 1125 and direct them to processor 1128 and insert OAMP cells destined to the trunk interface 1125 from the processor 1128. Header translation circuitry 1124 translates header information in ATM cells arriving from or destined to the trunk interface 1125. Header translation circuitry 1124 may access header translation programs and data stored in RAM and ROM memory 1127. For example, processor 1128 may store VPI/VCI header field translation information in memory 1127 for use by header translation circuitry 1124. Header translation circuitry 1124 exchanges ATM cells with trunk interface circuitry 1125. Trunk interface circuitry 1125 provides a trunk connection to an ATM network. The trunk connection is, for example, a standard 45 Megabit per second T3 trunk connection.

Referring to FIG. 10 and FIG. 11, when a trunk card 1100 is coupled to the main trunk card slot 1013, cell transport interfaces 1101–1106 are coupled, respectively, to main trunk card signal paths 1021–1026, main MCP interface 1129 is coupled to main MCP signal path 1073, backup MCP interface 1130 is coupled to backup MCP signal path 1071, main MCP status interface 1131 is coupled to main MCP status signal path 1078, backup MCP status interface 1132 is coupled to backup MCP status signal path 1077, and trunk interface 1135 is coupled to trunk signal path 1080. Trunk card status output 1133 is coupled to signal paths 1075 over which a status signal is sent to the backup trunk card 1014 and trunk status input interface 1134 is coupled to signal path 1076 over which a status signal is received from the backup trunk card. Similarly, when a trunk card 1100 is coupled to backup trunk card slot 1014, the trunk card cell transport interfaces 1101–1106 are coupled to backplane signal paths 1031–1036, the main MCP interface 1129 is coupled to main MCP signal path 1074, backup MCP interface 1130 is coupled to backup MCP signal path 1072, main MCP status input 1131 is coupled to main MCP status signal paths 1078, backup MCP status input 1132 is coupled to backup MCP status signal path 1077, trunk card status output 1133 is coupled to output status signal path 1076, trunk card status input is coupled to the main trunk card's status output on signal path 1075, and trunk interface 1035 is coupled to trunk signal path 1081.

Figure 12:
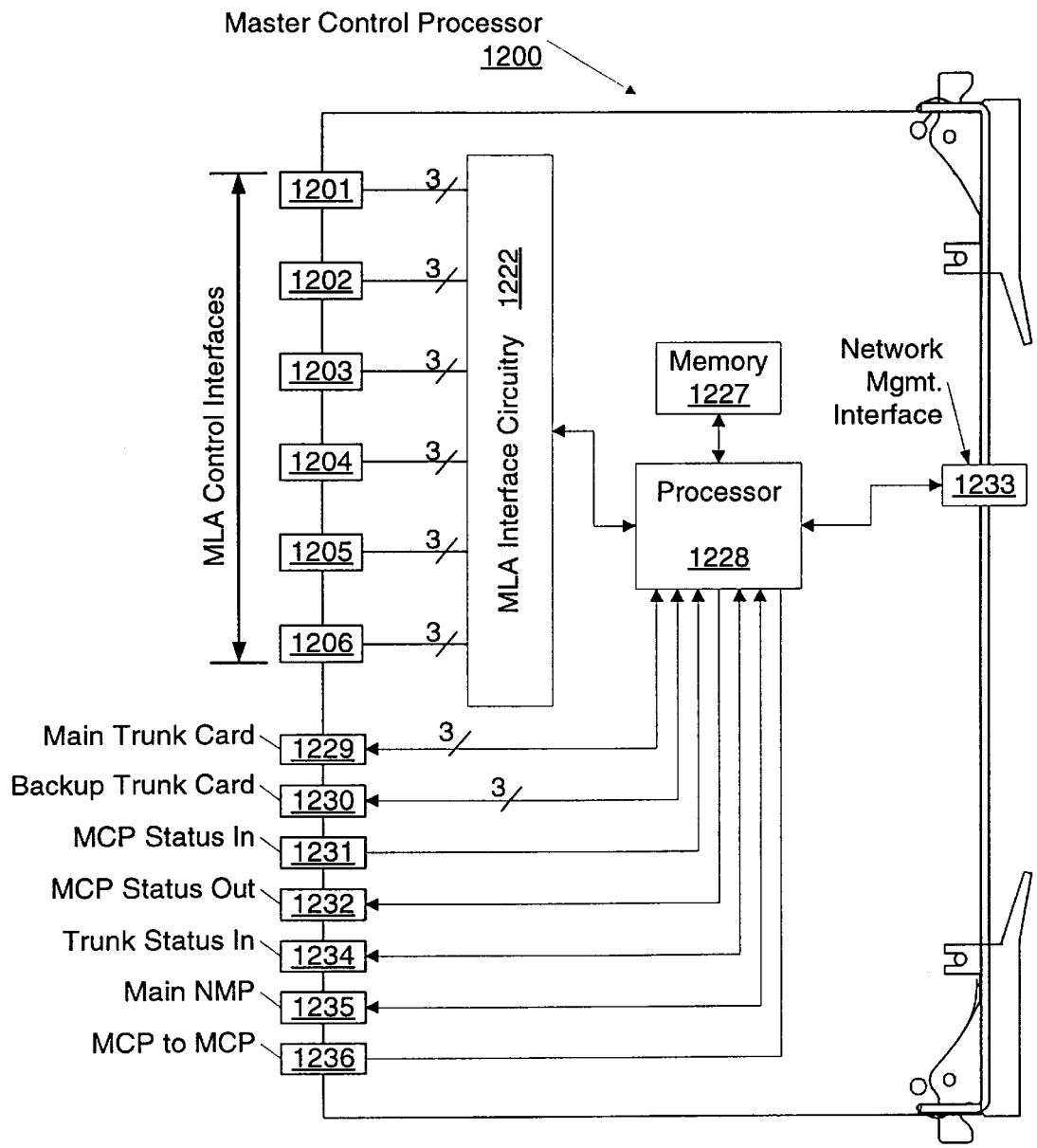
FIG. 12 is a master control processor in accordance with the invention.

FIG. 12 is a functional diagram of a master control processor (MCP). A MCP has MLA control interfaces 1201–1206, a main trunk card interface 1229, a backup trunk card interface 1230, a MCP status input interface 1231, a MCP status output interface 1232, and a trunk status input interface 1234. A MCP exchanges OAMP data with, and thereby controls, trunk cards, MLAs, LSMs, and line cards. For example, a MCP may determine VPI/VCI translations needed at MLAs, LSMs and line cards. The MCP may send translation information to a MLA over a MLA control interface 1201–1206 to establish MLA VPI/VCI translation tables. The MCP may also send control information to the MLA for subsequent forwarding from the MLA to the LSM and from the LSM to line cards to establish VPI/VCI translation tables at LSMs and line cards. In alternate implementations, a MCP may include an interface 1235 to a main NMP and to a backup NMP and may include a MCP-to-MCP interface 1236 to communicate data with a second MCP.

A MCP may exchange OAMP data with a main trunk card over main trunk card interface 1229 and with a backup trunk card over backup trunk card interface 1230. OAMP data exchanged over interfaces 1201–1206, and 1229–1230 may be determined by programs and data stored in memory 1227 or may arrive at the MCP from an external network management system coupled to interface 1233. Referring to FIGS. 8 and 12, each of the interfaces 1201–1206 and 1229–1230 includes a data transmit signal line, a data receive signal line, and a clock signal line. The MCP sends data by serial modulation of the data over the data transmit signal line and receives serially modulated data over the data receive signal line. Data exchanged over the data receive and data transmit signal lines is timed relative to a clock signal generated by the MCP and sent over the interfaces 1201–1206 and 1229–1230. Signals exchanged on the data receive and data transmit signal lines at interfaces 1201–1206 and 1229–1230 may transition from an asserted state to a de-asserted state on, for example, the falling edge of a 128 KHz clock pulse and be sampled on the rising edge of a clock pulse. Additionally, data signals exchanged on the data transmit and data receive signal lines may conform to the OSI HDLC protocol.

To process signals on interfaces 1201–1206 and 1229–1236, a trunk card has, for example, MLA interface circuitry 1222, processor 1228 and memory 1227. MLA interface circuitry 1220 controls the exchange of signals over MLA interfaces 1201–1206 and may include data multiplexing/de-multiplexing and buffering functions. Processor 1228 controls signals exchanged over interfaces 1201–1206, and 1229–1236 based on programs and data stored in memory 1227. Programs and data in memory 1227 may be determined by control signals arriving from an external network management system over interface 1233.

Referring to FIGS. 10 and 12, when a MCP 1200 is coupled to the main MCP slot 1015, the MCP's control interfaces 1201–1206 are coupled to main MCP signal paths 1041–1046, the MCP's main trunk card interface 1229 is coupled to main trunk card signal paths 1073, the MCP's backup trunk card interface 1230 is coupled to backup trunk card signal lines 1074, the MCP's status input interface 1231 is coupled to status signal path 1077 the MCP's status output interface 1232 is coupled to status signal path 1078 and the MCP's trunk status interface 1234 is coupled to status signal path 1076. Similarly, when the MCP is coupled to backup MCP slot 1016, the MCP's control interfaces 1201–1206 are coupled to backup signal paths 1051–1056, trunk card interfaces 1229 and 1230 are coupled, respectively, to trunk card signal paths 1071 and 1072, and MCP status input 1031, MCP status output 1032, and trunk status 1234 interfaces are coupled, respectively to status signal paths 1078, 1077, and 1076.

Figure 13:
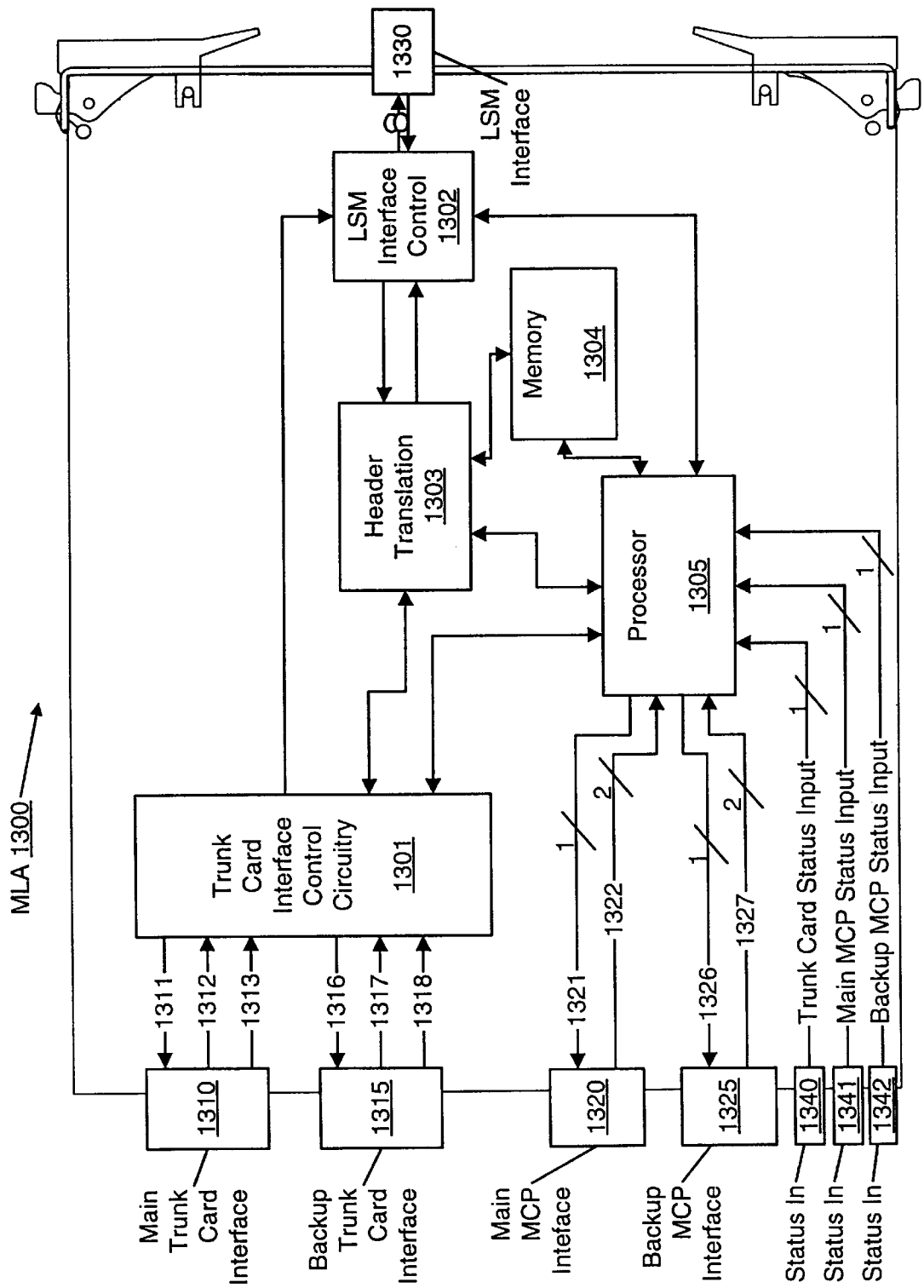
FIG. 13 is a master line shelf adapter in accordance with the invention.

Trunk cards 1100 and MCPs 1200 communicate over MCS backplane 1000 with MLAs in MLA slots 1001–1006. FIG. 13 is a functional diagram of a MLA. A MLA 1300 has a main trunk card interface 1310, a backup trunk card interface 1315, a main MCP interface 1320, a backup MCP interface 1325, a trunk card status input 1340, a main MCP status input 1341, a backup MCP status input 1342 and an interface 1330 to a LSM. A MLA includes, for example, circuitry 1301–1305 to process signals on the interfaces 1310, 1315, 1320, 1325, 1330, 1340–1342.

Trunk card interface control circuitry 1301 process ATM cell transfer signals exchanged over the main trunk card interface 1310 and backup trunk card interface 1315. Interface control circuitry 1301 provides, for example, ATM cell buffering and control of ATM cell exchange over interfaces 1310 and 1315. Additionally, interface circuitry 1301 may extract or insert OAMP cells to be exchanged between the processor 1305 and a trunk card. The interface control circuitry may also send ATM cells to and receive ATM cells from header translation circuitry 1303. Header translation circuitry 1303 performs VPI/VCI header field translation and other ATM cell header manipulation functions. Header translation circuitry 1303 may determine appropriate header manipulations based on, for example, programs and translation tables stored in RAM and ROM memory 1304. Memory 1304 may include programs and data stored by processor 1305. Additionally, header translation circuitry 1303 interfaces with LSM interface control circuitry 1302. LSM interface control circuitry 1302 may extract or insert OAMP cells to be exchanged between the processor 1305 and a LSM. Additionally LSM interface control circuitry 1302 regulates ATM cell transport on, for example, a fiber optic SONET OC-3c interface 1330 to a LSM.

Referring to FIGS. 10 and 13, when a MLA 1300 is coupled to one of MLA slots 1001–1006, the MLA's primary trunk card interface 1310 is coupled to one of main trunk card signal paths 1021–1026, the MLA's backup trunk card interface 1315 is coupled to one of the backup trunk card signal paths 1031–1036, the MLA's main MCP interface 1320 is coupled to one of signal paths 1041–1046, the MLA's backup MCP interface 1325 is coupled to one of signal paths 1051–1056, its trunk card status input interface 1340 is coupled to signal path 1076, its main MCP status input interface 1341 is coupled to signal path 1078, and its backup MCP status input interface 1342 is coupled to signal path 1077.

The described coupling between MLAs, trunk cards, MCPs, and MCS backplane signal paths provides each MLA with dedicated connections to two trunk cards and to two MCPs. For example, when a MLA 1300 is inserted in MLA slot 1001, the MLA's main trunk card interface 1310 will be coupled to the cell transport interface 1101 of a main trunk card by backplane signal paths 1021, the MLA's backup trunk card interface 1315 will be coupled to the cell transport interface 1101 of a backup trunk card by backplane signal paths 1031, the MLA's main MCP interface 1320 will be coupled to control interface 1201 of a main MCP by backplane signal paths 1041, the MLA's backup MCP interface 1325 will be coupled to the MLA control interface 1201 of a backup MCP by backplane signal paths 1051, the MLA's trunk card status interface 1340 will be coupled to the status output interface 1133 of the backup trunk card by signal paths 1076, the MLA's main MCP status interface 1341 will be coupled to the status output interface 1232 of the main MCP by signal paths 1078, and the MLA's backup MCP status interface 1342 will be coupled to the status output interface 1232 of the backup MCP by signal paths 1077. Similarly, when a MLA is inserted in MLA slot 1002, the MLA's main trunk card interface 1310 will be coupled to the cell transport interface 1102 of a main trunk card by backplane signal paths 1022, the MLA's backup trunk card interface 1315 will be coupled to the cell transport interface 1102 of a backup trunk card by backplane signal paths 1032, the MLA's main MCP interface 1320 will be coupled to the MLA control interface 1202 of a main MCP is by backplane signal paths 1042, the MLA's backup MCP interface 1325 will be coupled to the control interface 1202 of a backup MCP by backplane signal paths 1052, and MLA's trunk card status interface 1340 will be coupled to the status output interface 1133 of the backup trunk card by backplane signal paths 1076, the main MCP status interface 1341 will be coupled to the main MCP's status output interface 1232 by backplane signal paths 1078, and the backup MCP status interface 1342 will be coupled to the backup MCP's status output interface 1232 by backplane signal paths 1077. MLAs inserted in MLA slots 1003–1006 are similarly connected by backplane signal paths to the main and backup trunk cards and to the main and backup MCPs.

A MLA's main trunk card interface 1310 includes MLA to trunk card cell transport signal lines 1311, trunk card to MLA cell transport signal lines 1312, and timing signal lines 1313. Signal lines 1311, 1312, and 1313 are coupled to complementary signal lines at a trunk card's cell transport interfaces 1101–1106 (FIG. 11) by MCS backplane signal paths 1021–1026 (FIG. 10). Signals modulated over signal lines 1311 are used to send ATM cells from a MLA to a trunk card. Signals modulated over signal lines 1312 are used to receive ATM cells from a trunk card. Signals exchanged over signal lines 1311 and 1312 are modulated in reference to clock signals on timing signal lines 1313.

MLA to trunk card signal lines 1311 include a MLA Send Ready (MLA-SR) signal line, a Trunk Card Receive Ready (TC-RR) signal line and eight MLA Data (MLA-DATA) signal lines over which, respectively, a MLA-SR, TC-RR, and eight MLA-DATA signals are modulated. The trunk card to MLA signal lines 1312 include a Trunk Card Send Ready (TC-SR) signal line, a MLA Receive Ready (MLA-RR) signal line and eight Trunk Card Data (TC-DATA) signal lines over which, respectively, a TC-SR, MLA-RR and eight TC-DATA signals are modulated. Timing signal lines 1313 include signal lines receiving 19.44 MHz and 8 KHz network reference timing signal lines and a 25 MHz data transfer timing signal.

Figure 14A:
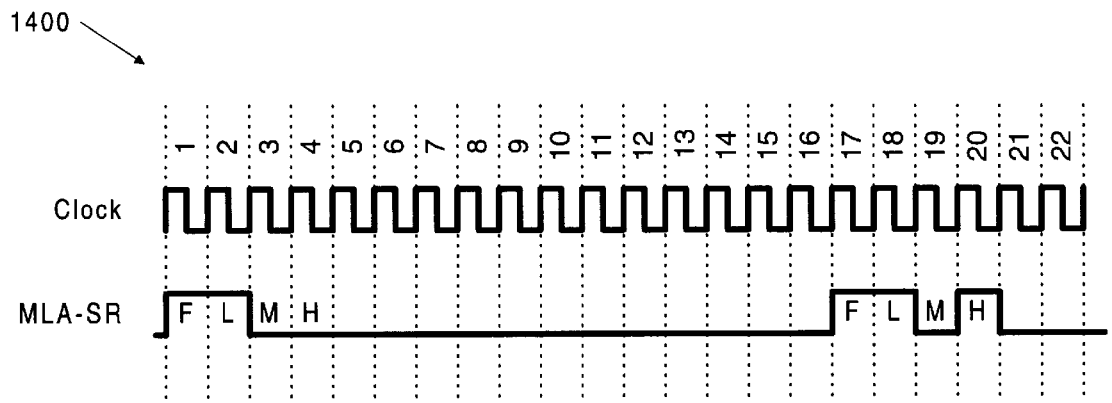
FIGS. 14A and 14B are signal timing diagrams in accordance with the invention.

ATM cells are transferred from a MLA to a trunk card by the exchange of MLA-SR, TC-RR, and MLA-DATA signals over the MLA to trunk card signal lines 1311. FIG. 14A illustrates timing of the MLA-SR signal. The MLA-SR signal is used to indicate that the MLA is ready to send an ATM cell to the trunk card. ATM cells transferred between a MLA and a trunk card can be arranged into, for example, low "L", medium "M", and high "H" priority cell transfers. The MLA-SR signal indicates the various priority cells available for transmission to the trunk card. The MLA-SR signal indicates waiting cell priority by a pulse modulated signal that follows a framing indicator. The framing indicator is periodically sent at, for example, sixteen clock cycle intervals.

In the exemplary MLA-SR signal timing diagram 1400, a framing indicator "F" is sent at a sixteen clock cycle interval. The framing indicator is followed by a pulse modulated signal indicating the various priority cells waiting for transport to the trunk card. For example, at clock cycle 1 the framing signal is sent by asserting (high) the MLA-SR signal. If, for example, only low priority cells are waiting, the MLA-SR signal will remain asserted for one clock period following the framing indicator (clock 2), the MLA-SR will then be de-asserted at clock 3 and remain de-asserted until the next framing indicator is sent at clock 17. If, for example, low and high priority cells are to be indicated, the MLA-SR signal will be asserted during the first and third clock cycle following the framing indicator as shown in the timing diagram 1400 by the asserted MLA-SR signal at clock periods 18 and 20 following a framing indicator at clock 17. Additional cell priority indicators may be similarly defined.

Figure 14B:
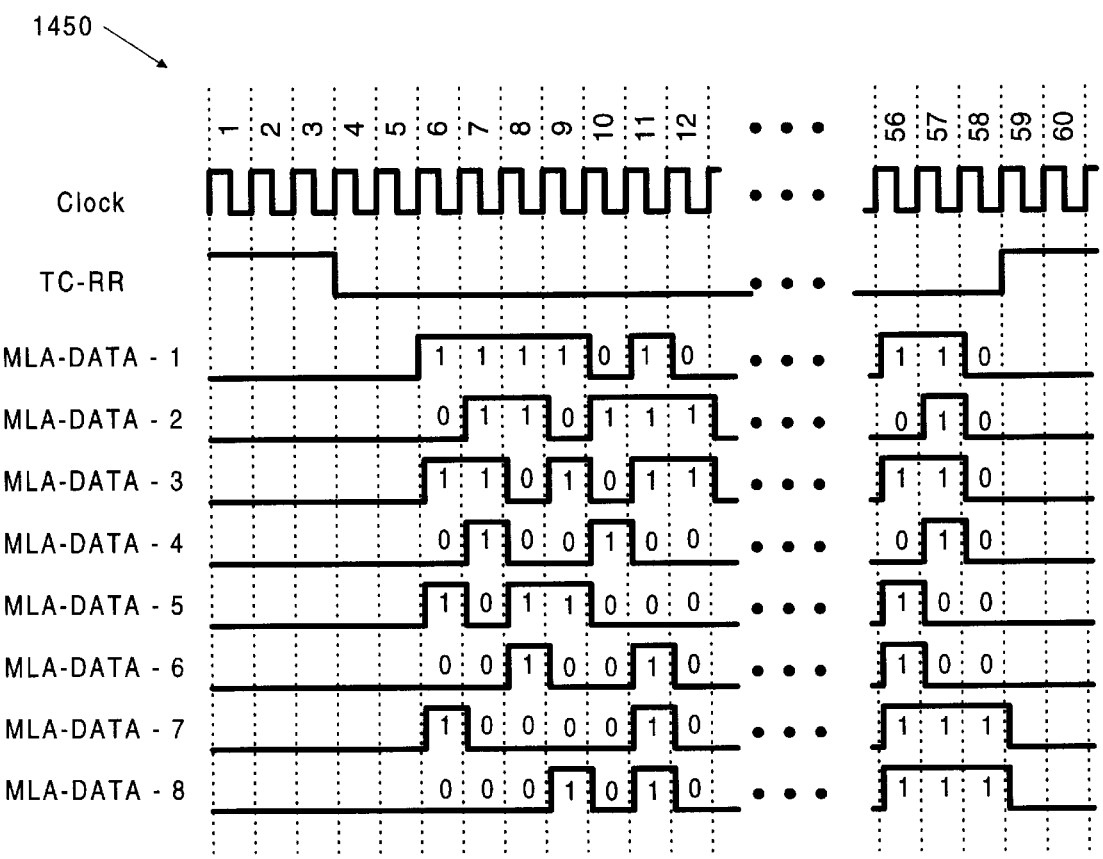

After the MLA indicates that an ATM cell is available for transfer to the trunk card, the trunk card will indicate that it is ready to receive the cell by asserting (low) the TC-RR signal. Data is then transferred from the MLA to the trunk card by modulating the eight MLA-DATA signals (MLA-DATA-1 through MLA-DATA-8) over the MLA-DATA signal lines. FIG. 14B is a signal timing diagram illustrating states of the TC-RR and MLA-DATA signals during an ATM cell transfer from the MLA to the trunk card. When a trunk card is ready to receive a cell from the MLA, it asserts the TC-RR signal. The TC-RR signal remains asserted during the entire cell transfer period. During the two clock cycles following the trunk card's assertion of the TC-RR signal, the eight MLA-DATA signals are not sampled by a receiving trunk card and therefore the eight MLA-DATA values are undefined. The MLA then begins a parallel transfer of data by modulating each of the eight MLA-DATA signals at rising edges of a clock signal. This parallel modulation of MLA-DATA signals provides a one byte data transfer during each clock cycle. For example, FIG. 14B shows the transfer of a "01010101" byte value during clock 6, a "00001111" byte value during clock 7 and a "00110011" byte value during clock 8. Modulation of the MLA-DATA signals continues until transfer of the ATM cell is complete. For example, to transfer a 53-byte ATM cell, the MLA-DATA signals are modulated for a 53 clock cycle period.

Figure 15A:
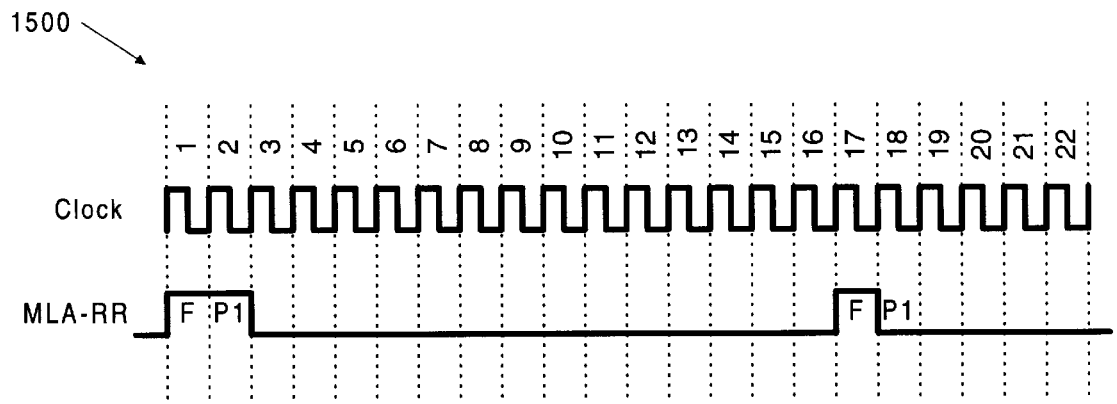
FIGS. 15A and 15B are signal timing diagrams in accordance with the invention.

ATM cells may also be transferred from the trunk card to the MLA. Data is transferred from the trunk card to the MLA by exchanging MLA-RR, TC-SR, and TC-DATA signals over the cell transport signal lines 1312. FIG. 15A illustrates timing and modulation of the MLA-RR signal. The MLA-RR signal is used to indicate that a MLA is ready to receive an ATM cell. A MLA can receive cells at, for example, a single MLA port addresses "P1." The MLA-RR signal is periodically asserted (high) to transmit a framing indicator. The framing indicator is followed by information indicating whether the MLA port is ready to receive a cell transfer. The framing indicator "F" is sent at, for example, sixteen clock cycle intervals. Following the framing indicator, the MLA-RR signal is asserted to indicate that the MLA is ready to receive an ATM cell or de-asserted to indicate that the MLA is not ready to receive an ATM cell. For example, referring to FIG. 15A, at clock cycle 1 a framing indicator is sent by asserting the MLA-RR signal. Following the framing indicator, the MLA-RR signal is asserted at clock 2 to indicate the MLA is ready to receive a cell transfer. The MLA-RR signal is then de-asserted and remains de-asserted until the next framing indicator is sent at clock 17. Following the framing indicator at clock 17, the MLA-RR signal is de-asserted indicating that the MLA is not ready to receive an additional cell transfer.

Figure 15B:
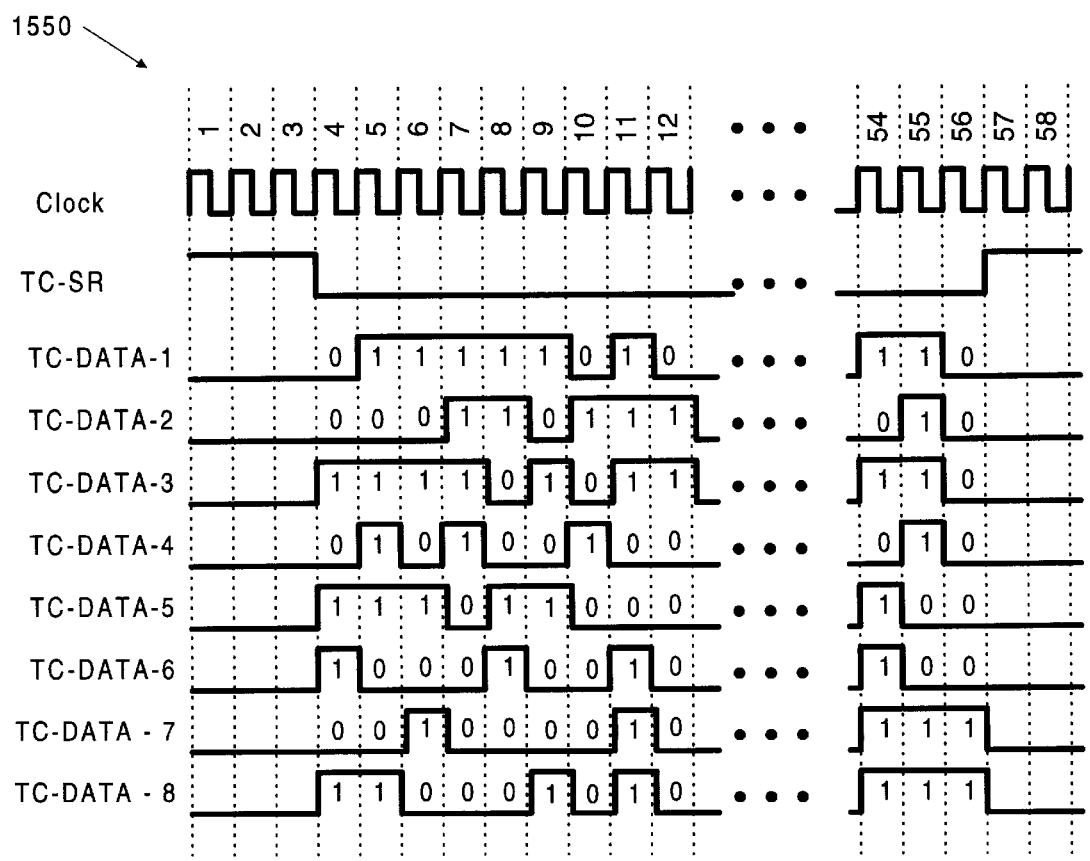

When an ATM cell is to be transferred from a trunk card to a MLA, the TC-SR indicates the start of data transfer and the eight TC-DATA signals (TC-DATA-1 through TC-DATA-8) are used to transfer the ATM cell. FIG. 15B is a signal timing diagram illustrating timing and modulation of the TC-SR and TC-DATA signals during a data transfer from a trunk card to a MLA. After the MLA indicates that it is ready to receive an ATM cell, the trunk card may send a cell to that MLA. To send a cell to the MLA, the trunk card asserts the TC-SR signal (low) and begins transfer of the cell by modulating the eight TC-DATA signals. The TC-SR signal remains asserted during the entire data transfer. For example, FIG. 15B shows the trunk card asserting the TC-SR signal at clock 4 while simultaneously beginning the transfer of data. During each clock cycle a full byte of data is transferred. For example, FIG. 15B shows the transfer of the data value "10110100" during clock 4, the data value "10011101" during clock 5, and the data value "01010101" during clock 6. Modulation of the TC-DATA signals continues until the ATM cell is transferred. For example, to transfer a 53-byte ATM cell, the TC-DATA signals are modulated for a total of 53 clock cycles.

In addition to exchanging ATM cells with the trunk card, the MLA can exchange OAMP data with a MCP. Referring back to FIGS. 8 and 13, a MLA includes a main MCP interface 1320 and a backup MCP interface 1325. The main MCP interface 1320 includes a data transmit signal line 1321 to send data to a MCP and two signal lines 1322 over which data and clock signals are received from the MCP. The MLA sends data to the MCP in serial fashion by modulating a signal over the data transmit signal line and receives similarly modulated data from the MCP over the data receive signal line. Data exchanged over the data receive and data transmit signal lines is timed relative to a clock pulse sent by the MCP to the MLA over the clock signal line. Signals exchanged on the data receive and data transmit lines may transition from an asserted state to a de-asserted state on, for example, the falling edge of a 128 KHz clock pulse and be sampled on the rising edge of a clock pulse. Additionally, data signals exchanged on the data transmit and data receive signal lines may conform to the OSI HDLC protocol.

In an exemplary implementation, MLAs, trunk cards, and MCPs may be interconnected by a master control shelf backplane that includes twelve MLA slots, two MCP slots, and two trunk card slots. Each MLA slot may include electrical connectors manufactured by FCI/Burndy as part number HM1W53DPR000H9. MLA slots receive corresponding MLA mating connectors. Each trunk card slot may include three HM1W53DPR000H9 and one HM1W52DPR000H9 connectors and receive trunk cards having corresponding mating connectors. Each MCP slot may include two HM1W53DPR000H9 connectors and receive a MCP having corresponding mating connectors. Master control shelf backplane interconnections for this exemplary implementation are detailed in Table 2. In Table 2, the backup trunk card slot includes connectors labeled J207, J307, J407, and J507, the main trunk card slot includes connectors labeled J208, J308, J408 and J508, the twelve MLA slots include connectors labeled J209 through J220, respectively, the backup MCP slot includes connectors labeled J205 and J305 and the main MCP slot includes connectors labeled J206 and J306.

In Table 2, a three digit number preceded by the letter "J" designates a master control shelf connector. Connector pins can be electrically coupled by backplane signal lines to other connector pins. Table 2 describes the interconnections between connector pins. In Table 2, the "Connection" column list one or more pins identified by connector designations followed by a hyphen and a comma-separated list of connector pin identifiers. A "pin" is identified by a two-digit number preceded by "A", "B", "C", "D", or "E" conforming to FCI/Burndy standard connector numbering practices. Pins identified in the "Connection" column are coupled by backplane signal lines to corresponding pins as designated in the "Connection To" column. In various implementations, alternate connectors may be used and each connector may include additional interconnections such as electrical power, signal grounding, and signals to other line card shelf components.

TABLE 2

| Connection | Connection To | Function |
| --- | --- | --- |
| J205-A24, A21, A18, B24, B21, B18, D24, D21, D18, B24, E21, E18 | Pin B1 of connectors J209–J220, respectively. | Control link data from MLAs 01–12, respectively, to backup MCP |
| J305-A2; J205-A23, A20; J305-B2; J205-B23, B20; J305-D2; J205-D23, D20; J305-E2; J205-E23, E20 | Pin A2 of connectors J209–J220, respectively. | Control link clock to MLAs 01–12, respectively, from backup MCP. |
| J305-A1; J205-A22, A19; J305-BT; J205-B22, B19; J305-D1; J205-D22, D19; J305-E1; J205-E22, E19 | Pin A1 of connectors J209–J220, respectively. | Control link data from backup MCP to MLAs 01–12, respectively. |
| J206-A24, A21, A18, B24, B21, B18, D24, D21, D18, E24, E21, E18 | Pin B3 of connectors J209–J220, respectively. | Control link data from MLAs 01–12, respectively, to main MCP |

TABLE 2-continued

| Connection | Connection To | Function |
|---|---|---|
| J306-A2; J206-A23, A20; J306-B2; J206-B23, B20; J306-D2; J206-D23, D20; J306-E2; J206-E23, E20 | Pin A4 of connectors J209–J220, respectively. | Control link clock from main MCP to MLAs 01–12, respectively. |
| J306-A1; J206-A22, A19; J306-B 1; J206-B22, B19; J306-D1; J206-D22, D19 J306-E1; J206-E22, E19 | Pin A3 of connectors J209–J220, respectively. | Control link data from main MCP to MLAs 01–12, respectively. |
| J305-A7, A8, A9, A10 | J306-B7, B8, B9, B10, respectively. | Status negotiation signals from backup MCP to main MCP to negotiate Active status. |
| J305-B7, B8, B9, B10 | J306-A7, A8, A9, A10, respectively. | Status negotiation signals from main MCP to backup MCP |
| J205-E8 | E6 of J209–J220; J206-E13; J207-D7; J208-D7 | Active/Inactive status signal from backup MCP to all MLAs, to main MCP, and to main and backup trunk cards. |
| J206-E8 | E7 of J209–J220; J205-B13; J207-D8; J208-D8 | Active/Inactive status signal from main MCP to all MLAs, to backup MCP, and to main and backup trunks. |
| J306-A5 | J207-E9 | Control link data from main MCP to backup trunk card. |
| J306-B5 | J208-E9 | Control link data from main MCP to main trunk card |
| J306-A6 | J207-E10 | Control link clock from main MCP to backup trunk card |
| J306-B6 | J208-E10 | Control link clock from main MCP to main trunk card |
| J306-A3 | J207-E11 | Control link data from protect trunk card to main MCP |
| J306-B3 | J208-E11 | Control link data from main trunk card to main MCP |
| J307-B5, A5, B15, A15; J407-B1, A1, B11, A11, B21, A21; J507-B7, A7 | E22 of connectors J209–J220, respectively. | MLA-DATA-1 to backup trunk card from MLAs 01–12, respectively. |
| J307-B4, A4, B14, A14, B24; A24; J407-B10, A10, B20, A20; J507-B6,A6 | E21 of connectors J209–J220, respectively. | MLA-DATA-2 to backup trunk card from MLAs 01–12, respectively. |
| J307-B3, A3, B13, A13, B23, A23; J407-B9, A9, B19, A19; J507-B5, A5 | E20 of connectors J209–J220, respectively. | MLA-DATA-3 to backup trunk card from MLAs 01–12, respectively. |
| J307-B2, A2, B12, A12, B22, A22; J407-B8, A8, B18, A18; J507-B4, A4 | E19 of connectors J209–J220, respectively. | MLA-DATA-4 to backup trunk card from MLAs 01–12, respectively. |
| J307-B1, A1, B11, A11, B21, A21; J407-B7, A7, B17, A17; J507-B3, A3 | E18 of connectors J209–J220, respectively. | MLA-DATA-5 to backup trunk card from MLAs 01–12, respectively. |
| J207-B24, A24; J307-B10, A10, B20, A20; J407-B6, A6, B16, A16; J507-B2, A2 | E17 of connectors J209–J220, respectively. | MLA-DATA-6 to backup trunk card from MLAs 01–12, respectively. |
| J207-B23, A23; J307-B9, A9, B19, A19; J407-B5, A5, B15, A15; J507-B1, A1 | E16 of connectors J209–J220, respectively. | MLA-DATA-7 to backup trunk card from MLAs 01–12, respectively. |
| J207-B22, A22; J307-B8, A8, B18, A18; J407-B4, A4, B14, A14, B24, A24 | E15 of connectors J209–J220, respectively. | MLA-DATA-8 to backup trunk card from MLAs 01–12, respectively. |
| J307-B6, A6, B16, A16; J407-B2, A2, B12, A12, B22, A22; J507-B8, A8 | Pin E23 of connectors J209–J220, respectively. | TC-RR signal from backup trunk card to MLAs 01–12, respectively. |
| J307-B7, A7, B17, A17; J407-B3, A3, B13, A13, B23, A23; J507-B9, A9 | E24 of connectors J209–J220, respectively | MLA-SR signal from MLAs 01–12, respectively, to backup trunk card. |
| J307-E5, D5, E15, D15; J407-E1, D1, E11, D11, E21, D21; J507-E7, D7 | B22 of connectors J209–J220, respectively. | TC-DATA-1 from backup trunk card to MLAs 01–12, respectively. |
| J307-E4, D4, E14, D14, E24; D24; J407-E10, D10, E20, D20; J507-E6, D6 | B21 of connectors J209–J220, respectively. | TC-DATA-2 from backup trunk card to MLAs 01–12, respectively. |
| J307-E3, D3, E13, D13, E23, D23; J407-E9, D9, E19, D19; J507-E5, D5 | B20 of connectors J209–J220, respectively. | TC-DATA-3 from backup trunk card to MLAs 01–12, respectively. |
| J307-E2, D2, E12, D12, E22, D22; J407-E8, D8, E18, D18; J507-E4, D4 | B19 of connectors J209–J220, respectively. | TC-DATA-4 from backup trunk card to MLAs 01–12, respectively. |
| J307-E1, D1, E11, D11, E21, D21; J407-E7, D7, E17, D17; J507-E3, | B18 of connectors J209–J220, respectively. | TC-DATA-5 from backup trunk card to MLAs 01–12, |

TABLE 2-continued

| Connection | Connection To | Function |
|---|---|---|
| D3 | | respectively. |
| J207-E24, D24; J307-E10, D10, E20, D20; J407-E6, D6, E16, D16; J507-E2, D2 | B17 of connectors J209–J220, respectively. | TC-DATA-6 from backup trunk card to MLAs 01–12, respectively. |
| J207-E23, D23; J307-E9, D9, E19, D19; J407-E5, D5, E15, D15; J507-E1, D1 | B16 of connectors J209–J220, respectively. | TC-DATA-7 from backup trunk card to MLAs 01–12, respectively. |
| J207-E22, D22; J307-E8, D8, E18, D18; J407-E4, D4, E14, D14, E24, D24 | B15 of connectors J209–J220, respectively. | TC-DATA-8 from backup trunk card to MLAs 01–12, respectively. |
| J307-E6, D6, E16, D16; J407-E2, D2, E12, D12, E22, D22; J507-E8, D8 | B23 of connectors J209–J220, respectively. | TC-SR signal from backup trunk card to MLAs 01–12, respectively. |
| J307-E7, D7, E17, D17; J407-E3, D3, E13, D13, E23, D23; J507-E9, D9 | B24 of connectors J209–J220, respectively. | MLA-RR signal to backup trunk card from MLAs 01–12, respectively. |
| J308-B5, A5, B1S, A15; J408-B1, A1, B11, A11, B21, A21; J508-B7, A7 | D22 of connectors J209–J220, respectively. | MLA-DATA-1 to main trunk card from MLAs 01–12, respectively. |
| J308-B4, A4, B14, A14, B24; A24; J408-B10, A10, B20, A20; J508-B6, A6 | D21 of connectors J209–J220, respectively. | MLA-DATA-2 to main trunk card from MLAs 01–12, respectively. |
| J308-B3, A3, B13, A13, B23, A23; J408-B9, A9, B19, A19; J508-B5, A5 | D20 of connectors J209–J220, respectively. | MLA-DATA-3 to main trunk card from MLAs 01–12, respectively. |
| J308-B2, A2, B12, A12, B22, A22; J408-B8, A8, B18, A18; J508-B4, A4 | D19 of connectors J209–J220, respectively. | MLA-DATA-4 to main trunk card from MLAs 01–12, respectively. |
| J308-B1, A1, B11, A11, B21, A21; J408-B7, A7, B17, A17; J508-B3, A3 | D18 of connectors J209–J220, respectively. | MLA-DATA-5 to main trunk card from MLAs 01–12, respectively. |
| J208-B24, A24; J308-B10, A10, B20, A20; J408-B6, A6, B16, A16; J508-B2, A2 | D17 of connectors J209–J220, respectively. | MLA-DATA-6 to main trunk card from MLAs 01–12, respectively. |
| J208-B23, A23; J308-B9, A9, B19, A19; J408-B5, A5, B15, A15; J508-B1, A1 | D16 of connectors J209–J220, respectively. | MLA-DATA-7 to main trunk card from MLAs 01–12, respectively. |
| J208-B22, A22; J308-B8, A8, B18, A18; J408-B4, A4, B14, A14, B24, A24 | D15 of connectors J209–J220, respectively. | MLA-DATA-8 to main trunk card from MLAs 01–12, respectively. |
| J308-B6, A6, B16, A16; J408-B2, A2, B12, A12, B22, A22; J508-B8, A8 | Pin D23 of connectors J209–J220, respectively. | TC-RR signal from main trunk card to MLAs 01–12, respectively. |
| J308-B7, A7, B17, A17; J408-B3, A3, B13, A13, B23, A23; J508-B9, A9 | D24 of connectors J209–J220, respectively | MLA-SR signal from MLAs 01–12, respectively, to main trunk card. |
| J308-E5, D5, E15, D15; J408-E1, D1, E11, D11, E21, D21; J508-E7, D7 | A22 of connectors J209–J220, respectively. | TC-DATA-1 from main trunk card to MLAs 01–12, respectively. |
| J308-E4, D4, E14, D14, B24; D24; J408-E10, D10, E20, D20; J508-E6, D6 | A21 of connectors J209–J220, respectively. | TC-DATA-2 from main trunk card to MLAs 01–12, respectively. |
| J308-E3, D3, E13, D13, E23, D23; J408-E9, D9, E19, D19; J508-E5, D5 | A20 of connectors J209–J220, respectively. | TC-DATA-3 from main trunk card to MLAs 01–12, respectively. |
| J308-E2, D2, E12, D12, E22, D22; J408-E8, D8, E18, D18; J508-E4, D4 | A19 of connectors J209–J220, respectively. | TC-DATA-4 from main trunk card to MLAs 01–12, respectively. |
| J308-E1, D1, E11, D11, E21, D21; J4082E7, D7, E17, D17; J508-E3, D3 | A18 of connectors J209–J220, respectively. | TC-DATA-5 from main trunk card to MLAs 01–12, respectively. |
| J208-E24, D24; J308-E10, D10, E20, D20; J408-E6, D6, E16, D16; J508-E2, D2 | A17 of connectors J209–J220, respectively. | TC-DATA-6 from main trunk card to MLAs 01–12, respectively. |
| J208-E23, D23; J308-E9, D9, E19, D19; J408-E5, D5, E15, D15; J508-E1, D1 | A16 of connectors J209–J220, respectively. | TC-DATA-7 from main trunk card to MLAs 01–12, respectively. |
| J208-E22, D22; J308-E8, D8, E18, D18; J408-E4, D4, E14, D14, E24, D24 | A15 of connectors J209–J220, respectively. | TC-DATA-8 from main trunk card to MLAs 01–12, respectively. |
| J308-E6, D6, E16, D16; J408-E2, D2, E12, D12, E22, D22; J508-E8, D8 | A23 of connectors J209–J220, respectively. | TC-SR signal from main trunk card to MLAs 01–12, respectively. |
| J308-E7, D7, E17, D17; J408-E3, D3, E13, D13, E23, D23; J508-E9, D9 | A24 of connectors J209–J220, respectively. | MLA-RR signal to main trunk card from MLAs 01–12, respectively. |
| J207-A12, A11, A10, A9, A8, A7, | D12 of each MLA J209– | 25 MHz clock signal from |

TABLE 2-continued

| Connection | Connection To | Function |
| --- | --- | --- |
| A6, A5, A4, A3, A2, A1 | J220, respectively. | backup trunk card to MLAs 01–12, respectively. |
| J208-A12, A11, A10, A9, A8, A7, A6, A5, A4, A3, A2, A1 | E13 of each MLA J209–J220, respectively. | 25 MHz clock signal from main trunk card to MLAs 01–12, respectively. |
| J207-B12, B11, B10, B9, B8, B7, B6, B5, B4, B3, B2, B1 | D10 of each MLA J209–J220, respectively. | 19.44 MHz reference from backup trunk card to MLAs 01–12, respectively. |
| J208-B12, B11, B10, B9, B8, B7, B6, B5, B4, B3, B2, B1 | E11 of each MLA J209–J220, respectively. | 19.44 MHz reference from main trunk card to MLAs 01–12, respectively. |
| J207-D9 | E9 of each MLA J209–J220. | 8 KHz reference from backup trunk card to MLAs 01–12. |
| J208-D9 | E8 of each MLA J209–J220. | 8 KHz reference from main trunk card to MLAs 01–12. |
| J208-D6 | J207-D6. | Main trunk card status output to backup trunk card status input. |
| D207-D4 | J208-D4; 1205-E5; J206-E5; A5 of each MLA 1209-1220. | Backup trunk card status output to main trunk card status input, backup MCP trunk status input, main MCP trunk status input, and trunk status input of MLAs 01–12. |

The foregoing line card shelf and master control shelf descriptions are illustrative. In alternative implementations, a line card shelf may be constructed to hold up to X line cards, where X is a number that may be equal to, greater than, or lesser than the number of line card slots described herein. Line card shelves with a greater or lesser number of line card slots will have a corresponding increase or decrease in the number of LSM signal paths between the main LSM and line card slots and between the backup LSM and line card slots. Similarly, LSMs may include a greater or lesser number of line card interfaces to correspond to an increase or decrease in the number of line card slots in a line card shelf. Similarly, a line card shelf may be constructed to hold up to Y LSMs.

Line cards may be implemented to support one or more subscriber loops. For example, line cards may support two, four, or eight subscriber loops. Line cards supporting a greater or lesser number of subscriber loops may have a corresponding increase or decrease in the number of port addresses supported by the line card and may, correspondingly, implement a LC-RR signal having a increase or decrease in the number of ports that may be indicated.

Master control shelves may be constructed to hold up to X MLA units, where X is a number that may be equal to, greater than, or lesser than the number of MLA slots described herein. A MCS with a greater or lesser number of MLA slots will have, correspondingly, a greater or lesser number of MCS backplane signal paths connecting MLA slots to trunk cards and MLA slots to MCPs. Trunk cards used in a MCS with an increased or decreased number of MLA slots will have a corresponding increase or decrease in the number of cell transport interfaces. MCPs used in a MCS with an increased or decreased number of MLA slots will have a corresponding increase or decrease in the number of MLA control interfaces. For example, a MCS may have twelve MLA slots, accept trunk cards having twelve cell transport interfaces, and accept MCPs having twelve MLA control interfaces. Similarly, a master control shelf may have up to Y trunk cards and up to Z master control processors, where Y and Z may vary between implementations.

Line cards, line card shelves, LSMs, MLAs, MCPs, trunk cards, and MCSs may have interfaces and functionality in addition to that described in this specification. For example, line cards, line card shelves, LSMs, MLAs, MCPs, trunk cards, and MCSs may have additional power, signal grounding, and data transfer interfaces.

Implementations may alter the asserted and de-asserted states of signals from those described herein. For example, signals that are asserted (high) (that is, those having a high-voltage asserted state) may, in alternative implementations, have a low-voltage asserted state. Likewise, signals that are asserted (low) (that is, those having a low-voltage asserted state) may, in alternative implementations, be asserted in a high-voltage state. Additionally, signals illustrated as being asserted or de-asserted at the rising edge of a clock pulse may, in alternative implementations, be asserted or de-asserted on, for example, the falling edge of a clock pulse.

Clock frequencies at line card, LSM, MLA, trunk card, and MCP interfaces may differ from those described herein. For example, a MCS may include MLA control interfaces having a 256 KHz clock frequency allowing data transfer between the MCS and MLA at 256 Kbits/second and trunk cards may include cell transport interfaces having a 50 MHz clock frequency allowing data transfer between the trunk card and the MLA at 50 Mbytes/second. Clock frequencies may be varied depending on, for example, desired data transfer rates, signal propagation constraints, and circuitry response times.

In various implementations, either ITU-standard 53-byte ATM cells, non-standard ATM cells, or both ITU-standard and non-standard ATM cells may be employed. For example, a non-standard 54-byte cell may be formed by adding an additional parity byte to a standard 53-byte cell. This additional parity byte may provide for a parity check of the preceding 53 bytes ITU-standard ATM cell. Such a 54 byte cell may be sent, for example, between the trunk card and MLA, between the MLA and LSM, and between the LSM and each line card while an ITU-standard 53-byte ATM cell may be sent between the trunk card and an ATM network and between the line card and network access equipment at a customer's premises. Additionally, ATM cells may include non-standard header fields. For example, the fifth byte of the ATM cell, used for header error control information in a ITU-standard ATM cell, can be used for line card port identifying information in cells transmitted between the LSM and the line card.

Other embodiments are within the scope of the following claims.

What is claimed is:

1. Apparatus for communicating data cells between a data link and a backplane, comprising:

transceiver circuitry operative to transmit and receive data cells over the data link;

a main backplane interface configured to provide physical interconnection to the backplane, the main backplane interface including at least one cell signal terminal and at least one operations data signal terminal, each of the operations data signal terminals being separate from the cell signal terminals, the operations data signal terminals and the cell signal terminals being configured to connect to mating connectors on the backplane; and backplane interconnection circuitry operatively coupling the transceiver circuitry and the main backplane interface to each other for data cell transmission, the interconnection circuitry being operable to receive data cells from the transceiver circuitry and transmit them over the cell signal terminals, to receive data cells from the cell signal terminals and provide them to the transceiver circuitry for transmission over the data link, and to transmit and receive operations data over the operations data signal terminals; and wherein the cell signal terminals comprise separate terminals to receive cells and separate terminals to transmit cells, the terminals to receive cells comprise a first and second control terminal and at least one incoming cell data terminal, and the backplane interconnection circuitry asserts a signal on the first control terminal to indicate that the apparatus is ready to receive a cell, accepts a signal on the second control terminal as indicating that a cell is being sent to the apparatus, and receives data bits of the cell on the incoming cell data terminals.

2. The apparatus of claim 1 comprising a single incoming cell data terminal and wherein each bit of the cell is serially received over the single incoming cell data terminal.

3. The apparatus of claim 1 comprising eight incoming cell data terminals and wherein bits of the cell are received in parallel over the eight incoming cell data terminals.

4. Apparatus for communicating data cells between a data link and a backplane, comprising:

transceiver circuitry operative to transmit and receive data cells over the data link;

a main backplane interface configured to provide physical interconnection to the backplane, the main backplane interface including at least one cell signal terminal and at least one operations data signal terminal, each of the operations data signal terminals being separate from the cell signal terminals, the operations data signal terminals and the cell signal terminals being configured to connect to mating connectors on the backplane; and backplane interconnection circuitry operatively coupling the transceiver circuitry and the main backplane interface to each other for data cell transmission, the interconnection circuitry being operable to receive data cells from the transceiver circuitry and transmit them over the cell signal terminals, to receive data cells from the cell signal terminals and provide them to the transceiver circuitry for transmission over the data link, and to transmit and receive operations data over the operations data signal terminals; and wherein, the cell signal terminals comprise separate terminals to receive cells and separate terminals to transmit cells, the terminals to transmit cells comprise a first and second control terminal and at least one outgoing cell data terminal, and the backplane interconnection circuitry asserts a signal on the first control terminal to indicate that the apparatus is ready to transmit a cell, accepts a signal on the second control terminal as indicating that the apparatus can begin transferring the cell, and transmits data bits of the cell on the outgoing cell data terminal.

5. The apparatus of claim 4 comprising a single outgoing cell data terminal and wherein each bit of the cell is serially transmitted over the single outgoing cell data terminal.

6. The apparatus of claim 4 comprising eight outgoing cell data terminals and wherein bits of the cell are transmitted in parallel over the eight outgoing cell data terminals.

7. The apparatus of claim 4 wherein the signal indicating the unit is ready to transmit a cell includes a cell priority indicator.

8. Apparatus for communicating data cells between a data link and a backplane comprising:

transceiver circuitry operative to transmit and receive data cells over the data link;

a main backplane interface configured to provide physical interconnection to the backplane, the main backplane interface including at least one cell signal terminal and at least one operations data signal terminal, each of the operations data signal terminals being separate from the cell signal terminals, the operations data signal terminals and the cell signal terminals being configured to connect to mating connectors on the backplane;

backplane interconnection circuitry operatively coupling the transceiver circuitry and the main backplane interface to each other for data cell transmission, the interconnection circuitry being operable to receive data cells from the transceiver circuitry and transmit them over the cell signal terminals, to receive data cells from the cell signal terminals and provide them to the transceiver circuitry for transmission over the data link, and to transmit and receive operations data over the operations data signal terminals;

a backup backplane interface configured to provide physical interconnection to the backplane, the backup backplane interface including at least one cell signal terminal and at least one operations data signal terminal, each of the operations data signal terminals being separate from the cell signal terminals, the operations data signal terminals and the cell signal terminals being configured to connect to mating connectors on the backplane;

a status terminal connector configured to receive a status signal from a corresponding connector on the backplane and configured to operationally couple the status signal to the backplane interconnection circuitry, wherein the backplane interconnection circuitry is configured to transmit and receive data cells over the main backplane interface but not over the backup backplane interface during a first state of the status signal and to transmit and receive data cells over the backup backplane interface but not over the main backplane interface during a second state of the status signal.

9. The apparatus of claim 8 wherein, during the first state of the status signal the backplane interconnection circuitry is configured to transmit and receive operations data over the main backplane interface but not over the backup backplane interface, and during the second state of the status signal the backplane interconnection circuitry is configured to transmit and receive operations data over the backup backplane interface but not over the main backplane interface.

10. The apparatus of claim 8 further comprising a second status terminal connector to receive a second status signal from a corresponding connector on the backplane, and wherein, during a first state of the second status signal the backplane interconnection circuitry is configured to transmit and receive operations data over the main backplane interface but not over the backup backplane interface, and during a second state of the second status signal the backplane interconnection circuitry is configured to transmit and receive operations data over the backup backplane interface but not over the main backplane interface.

11. Apparatus for communicating data cells between a data link and a backplane, comprising:

transceiver circuitry operative to transmit and receive data cells over the data link;

a main backplane and a backup backplane interface, each configured to provide physical interconnection to the backplane, the main and the backup backplane interface each including at least one cell signal terminal and at least one operations data signal terminal, each of the operations data signal terminals being separate from the cell signal terminals, the operations data signal terminals and the cell signal terminals being configured to connect to mating connectors on the backplane;

backplane interconnection circuitry operatively coupling the transceiver circuitry to the main backplane interface and to the backup backplane interface, the interconnection circuitry being operable to receive data cells from the transceiver circuitry and transmit them over the cell signal terminals of the main and the backup interface, to receive data cells from the cell signal terminals of the main backplane interface and the backup backplane interface and to provide cells to the transceiver circuitry for transmission over the data link, and to transmit and receive operations data over the operations data signal terminals;

a status terminal connector configured to receive a status signal from a corresponding connector on the backplane and configured to operationally couple the status signal to the backplane interconnection circuitry, wherein the backplane interconnection circuitry is configured to transmit and receive data cells over the main backplane interface but not over the backup backplane interface during a first state of the status signal and to transmit and receive data cells over the backup backplane interface but not over the main backplane interface during a second state of the status signal.

12. The apparatus of claim 11 wherein:

the cell signal terminals comprise separate terminals to receive cells and separate terminals to transmit cells, the terminals to receive cells comprise a first and second control terminal and at least one incoming cell data terminal, the backplane interconnection circuitry asserts a signal on the first control terminal to indicate that the apparatus is ready to receive a cell, accepts a signal on the second control terminal as indicating that a cell is being sent to the apparatus, and receives data bits of the cell on the incoming cell data terminals, the terminals to transmit cells comprise a third and fourth control terminal and at least one outgoing cell data terminal, and the backplane interconnection circuitry asserts a signal on the third control terminal to indicate that the apparatus is ready to transmit a cell, accepts a signal on the fourth control terminal as indicating that the apparatus can begin transferring the cell, and transmits data bits of the cell on the outgoing cell data terminal.

\* \* \* \* \*